United States Patent [19]

Umeyama

[11] Patent Number: 5,156,067
[45] Date of Patent: Oct. 20, 1992

[54] TORSIONAL DAMPER TYPE FLYWHEEL DEVICE

[75] Inventor: Mitsuhiro Umeyama, Toyota, Japan

[73] Assignee: Toyota Jidosha Kabushiki Kaisha, Toyota, Japan

[21] Appl. No.: 737,606

[22] Filed: Jul. 25, 1991

Related U.S. Application Data

[63] Continuation of Ser. No. 331,612, Mar. 31, 1989, abandoned.

[30] Foreign Application Priority Data

| Apr. 1, 1988 | [JP] | Japan | 63-42875[U] |
| Apr. 8, 1988 | [JP] | Japan | 63-46779[U] |
| May 10, 1988 | [JP] | Japan | 63-60599[U] |
| Oct. 26, 1988 | [JP] | Japan | 63-138667[U] |

[51] Int. Cl.$^5$ .................. F16F 15/22; F16F 15/10
[52] U.S. Cl. .................. 74/574; 464/68; 74/573 F; 74/572; 192/106.1
[58] Field of Search .................. 74/572–574; 464/68; 192/106.1, 106.2, 70.17

[56] References Cited

U.S. PATENT DOCUMENTS

| 1,505,480 | 8/1924 | Manville | 74/572 |
| 1,684,568 | 9/1928 | Alexander | |
| 2,042,570 | 6/1936 | Wemp | 74/572 |
| 2,437,537 | 3/1948 | Kelleher | 74/572 |
| 2,729,079 | 1/1956 | Kuehn | 74/572 |
| 3,514,974 | 6/1970 | Adachi | 74/572 |
| 4,002,043 | 1/1977 | Yoshida | 74/572 |
| 4,093,054 | 6/1978 | Johns | 74/572 |
| 4,148,200 | 4/1979 | Schallhorn | |
| 4,220,233 | 9/1980 | Ban et al. | 74/572 |
| 4,274,524 | 6/1981 | Nakane | 74/572 |
| 4,351,168 | 9/1982 | Prince et al. | 74/572 |
| 4,445,876 | 5/1984 | Entrup | 74/572 |
| 4,468,207 | 8/1984 | Yoshida | 74/572 |
| 4,601,677 | 7/1986 | Takeuchi | 74/572 |
| 4,645,054 | 2/1987 | Raab | 74/572 |
| 4,662,239 | 5/1987 | Worner et al. | 74/572 |
| 4,663,983 | 5/1987 | Kobayashi et al. | 74/572 |
| 4,698,045 | 10/1987 | Billet et al. | 74/572 |
| 4,727,767 | 3/1988 | Aiki et al. | 74/572 |
| 4,747,800 | 5/1988 | Takeuchi | 74/572 |
| 4,747,801 | 5/1988 | Chassequet et al. | 74/572 |
| 4,748,868 | 6/1988 | Kobayashi et al. | 74/572 |
| 4,777,843 | 10/1988 | Bopp | 74/572 |

(List continued on next page)

FOREIGN PATENT DOCUMENTS

| 0259173 | 9/1988 | European Pat. Off. | |
| 0305189 | 3/1989 | European Pat. Off. | |
| 0308178 | 3/1989 | European Pat. Off. | |
| 2926012 | 10/1980 | Fed. Rep. of Germany | 74/572 |

(List continued on next page)

OTHER PUBLICATIONS

"Flywheel Damper Reduces Low Speed Diesel Noise and Vibrations", Auto Motive Engineering, vol. 93, p. 85, Jan. 1985.
Patent Abstracts of Japan, vol. 12, No. 222.
"Theory of Vibration Isolation", Shock and Vibration Handbook, vol. 2, McGraw Hill, pp. 30-1/30-17, 1961.

Primary Examiner—Vinh T. Luong
Attorney, Agent, or Firm—Cushman, Darby & Cushman

[57] ABSTRACT

A torsional damper type flywheel device includes drive side and driven side flywheels, a first spring mechanism connecting the drive side and driven side flywheels, a second spring mechanism which may include an air cushion spring, and a viscous damping mechanism arranged in series with the second spring mechanism. The series combination of the second spring mechanism and the viscous damping mechanism is arranged parallel to the first spring mechanism and connects the drive side and driven side flywheels. This flywheel device continuously changes its vibrational bahavior between two characteristics due to the action of the viscous damping mechanism. Due to the vibrational behavior change, no notable resonance occurs when the rotational speed passes through the resonance speed of the flywheel device. A continuously sliding friction mechanism is not used.

17 Claims, 20 Drawing Sheets

U.S. PATENT DOCUMENTS

| | | | |
|---|---|---|---|
| 4,892,008 | 1/1990 | Naudin et al. | 192/70.17 X |
| 4,899,617 | 2/1990 | Kobayashi et al. | 192/106.2 X |
| 4,905,539 | 3/1990 | Naudin et al. | 74/574 |
| 4,947,706 | 8/1990 | Umeyama et al. | 74/574 |

FOREIGN PATENT DOCUMENTS

| | | | |
|---|---|---|---|
| 3506818 | 9/1985 | Fed. Rep. of Germany | 74/572 |
| 3607240 | 9/1986 | Fed. Rep. of Germany . | |
| 2571461 | 4/1986 | France | 74/572 |
| 2593252 | 7/1987 | France | 74/572 |
| 8807147 | 9/1988 | Int'l Pat. Institute . | |
| 56-6676 | 2/1981 | Japan | 74/572 |
| 59-108848 | 7/1984 | Japan | 74/572 |
| 59-113548 | 7/1984 | Japan | 74/572 |
| 60-109635 | 6/1985 | Japan | 74/572 |
| 61-23542 | 2/1986 | Japan | 74/572 |
| 61-23543 | 2/1986 | Japan | 74/572 |
| 61-23544 | 2/1986 | Japan | 74/572 |
| 61-52423 | 3/1986 | Japan | 74/572 |
| 61-59024 | 3/1986 | Japan | 74/572 |
| 61-59040 | 3/1986 | Japan | 74/572 |
| 63-19440 | 1/1988 | Japan . | |
| 1066961 | 4/1967 | United Kingdom . | |
| 2000257 | 1/1979 | United Kingdom | 74/572 |
| 2103760 | 1/1983 | United Kingdom | 74/572 |
| 2109085 | 5/1983 | United Kingdom | 74/572 |
| 2141209 | 12/1984 | United Kingdom | 74/572 |
| 2160296 | 12/1985 | United Kingdom | 74/572 |
| 2163524 | 2/1986 | United Kingdom . | |
| 2170882 | 8/1986 | United Kingdom . | |
| 2186344 | 8/1987 | United Kingdom | 74/572 |

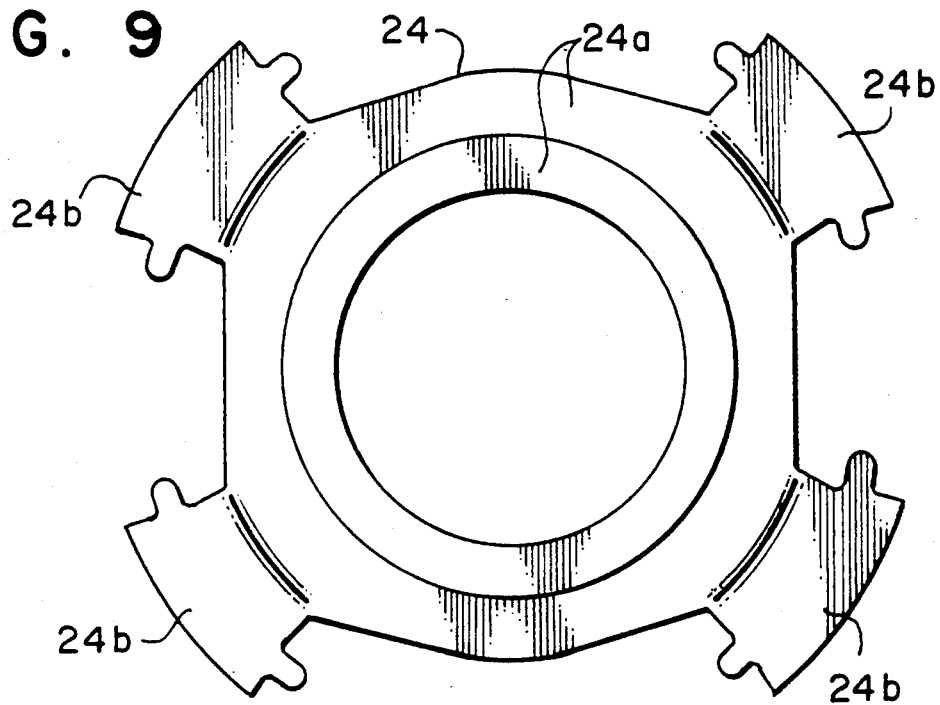
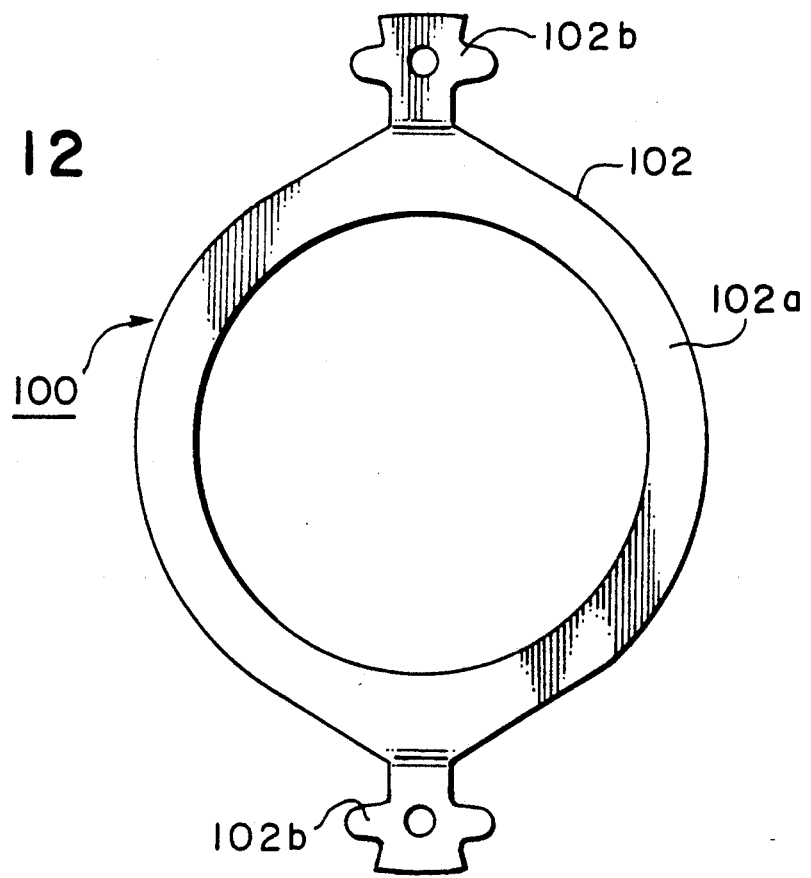

FIG. 14
FIG. 15
FIG. 19
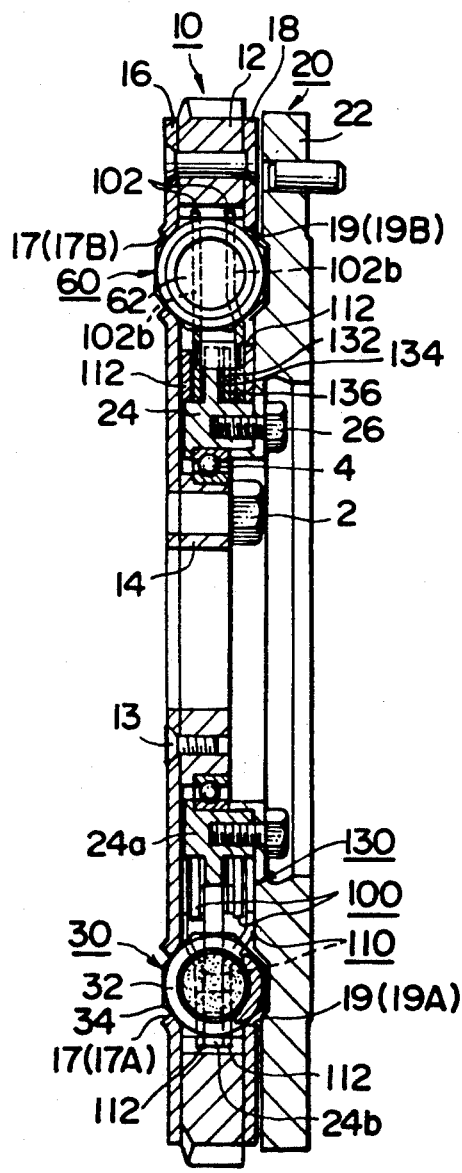
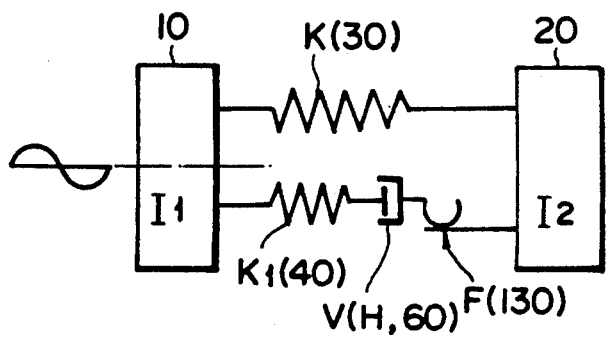
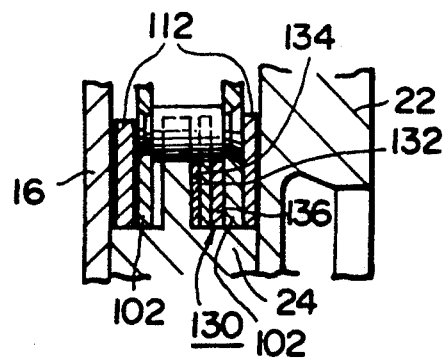

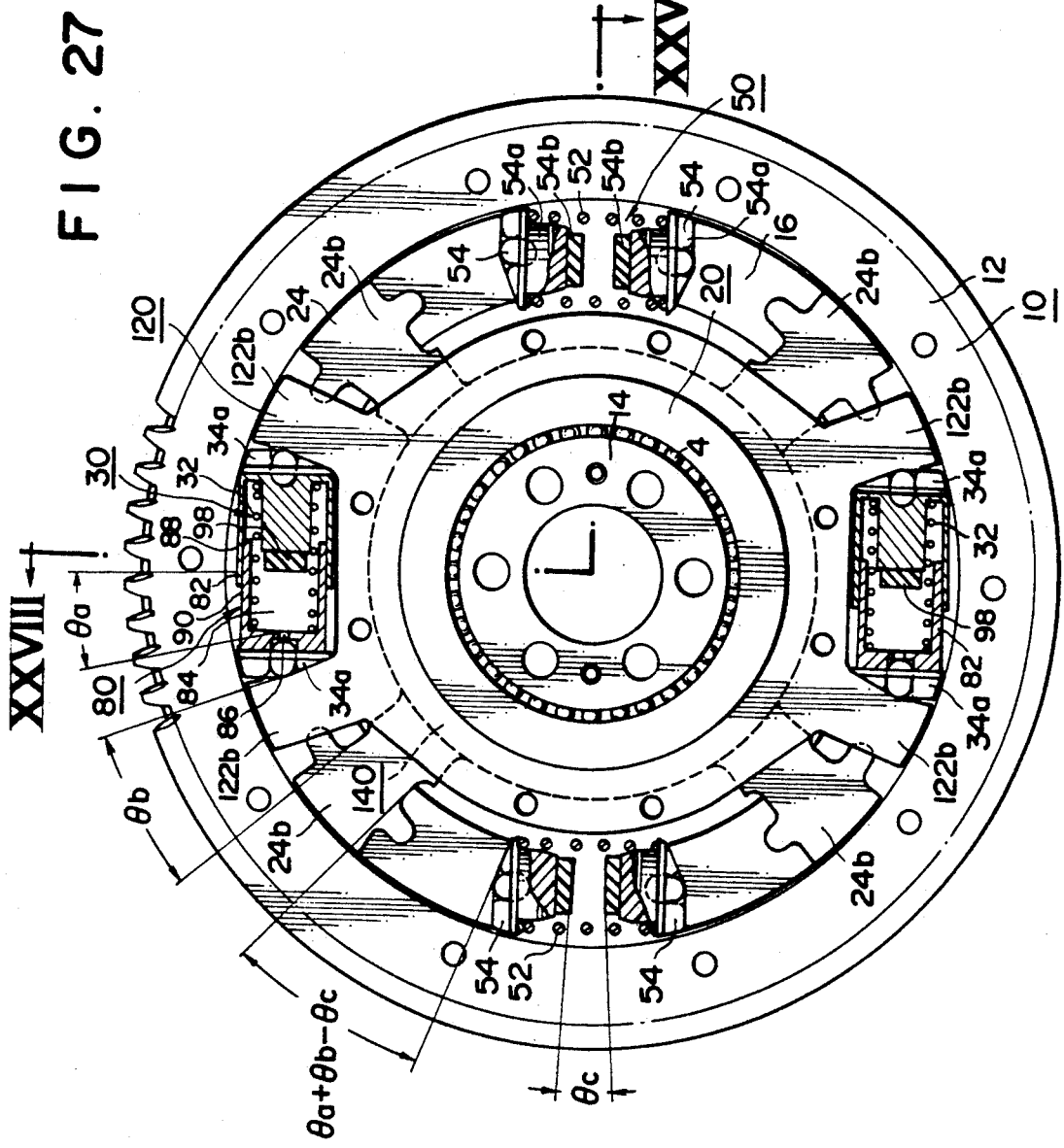

FIG. 28
FIG. 29
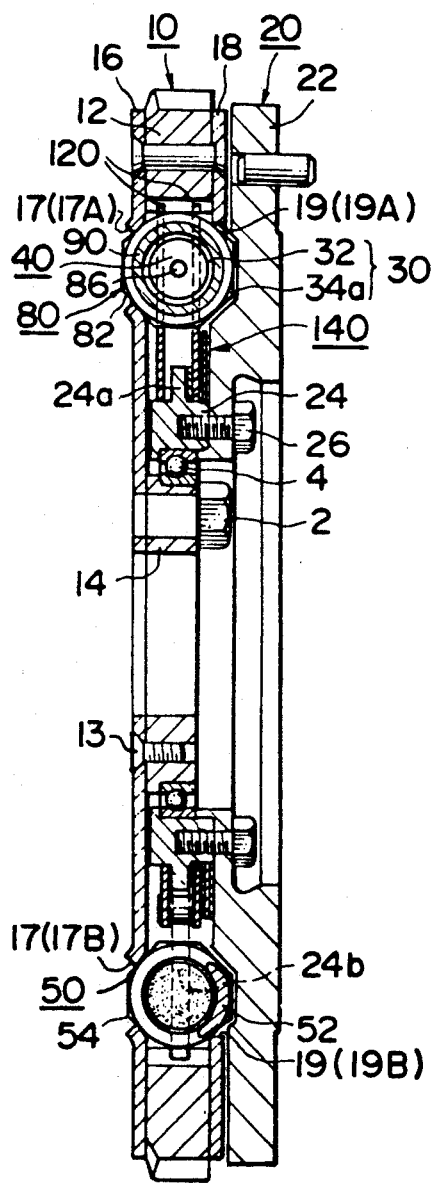
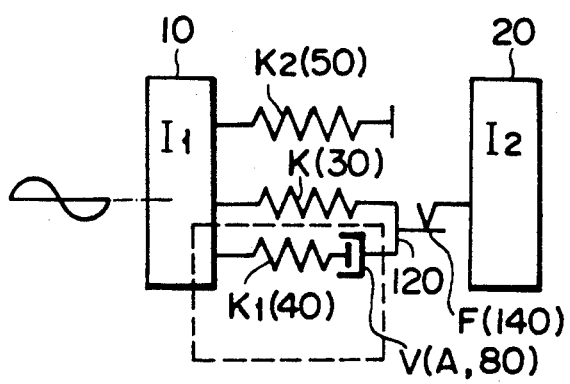

TORSIONAL DAMPER TYPE FLYWHEEL DEVICE

This is a continuation of application Ser. No. 07/331,612, filed on Mar. 31, 1989, which was abandoned upon the filing hereof.

BACKGROUND OF THE INVENTION

1. Field of the Invention

The present invention relates to torsional damper type flywheel devices having viscous damping mechanisms to suppress resonance.

2. Description of the Related Art

Flywheel devices which include drive side and driven side flywheels, a single kind of spring mechanism for connecting the drive side and driven side flywheels, and a friction mechanism are known, for example, in U.S. Pat. Nos. 4,468,207, 4,274,524, 4,351,168, 2,042,570, 4,445,876, 2,729,079, 2,437,537, 4,663,983, 4,220,233, and 4,002,043; Great Britain Patent Application GB-A-2,000,257; German Patent Application DE-A-2,926,012; Automotive Engineering, vol. 93, page 85; Japanese Utility Model Publications SHO 61-23542, SHO 61-23543, SHO 61-23544, SHO 59-113548, SHO 59-108848, SHO 56-6676, and SHO 56-109635; and Japanese Patent Publications SHO 61-59040, SHO 61-59042, and SHO 61-52423.

Any one of the above-described prior art flywheel devices has a single vibrational characteristic defined by the spring mechanism which may include a plurality of coil springs arranged in series with or parallel to each other. Due to the vibrational characteristic, the flywheel device has a single first mode resonance speed throughout the entire range of engine speeds. The single resonance speed is usually set lower than the idling speed of the engine, and when the engine speed passes through the resonance speed during start-up or stopping of the engine, the torsional vibration of the flywheel is amplified. To suppress the amplification, a continuously sliding friction mechanism (often called a hysteresis mechanism) which continuously slides throughout the entire range of engine speeds is usually disposed between the drive side and driven side flywheels.

However, there are two problems with the above-described prior art flywheel devices. One problem is that a considerably large resonance occurs at the resonance speed, in spite of the provision of the friction mechanism, because the characteristic of the flywheel device is determined more by the spring mechanism than by the friction mechanism. The other problem is that the continuously sliding friction mechanism degrades the acceleration transmittance rate (which corresponds to a speed variation or torque variation absorbing effect of the divisional type flywheel device) at the standard range of engine speeds above the idling speed. This is because a temporary sticking often occurs in the friction mechanism and because the frictional force makes the flywheel device operate as if the flywheel device were a non-divisional type device.

The U.S. patent application, Ser. No. 07/093,573, filed Sep. 4, 1987 (corresponding to European Patent Application No. 87307821.6), presents a quite different type of flywheel device designed to overcome the problems of the above-described prior art flywheel devices. That flywheel device includes drive side and driven side flywheels, two kinds of spring mechanisms (called a K spring mechanism and a K1 spring mechanism) arranged parallel to each other between the drive side and driven side flywheels, and a momentarily sliding friction mechanism arranged in series with the K1 spring mechanism. The vibrational behavior of that flywheel device can be understood through reference to the Shock and Vibration Hand Book, vol. 2, McGraw Hill, though it does not relate to a flywheel device.

More particularly, that flywheel device has two vibrational characteristics shown by the two-dotted lines in FIG. 5, namely, a K characteristic where only the K spring mechanism operates without being accompanied by the sliding of the friction mechanism and a K+K1 characteristic where both the K and K1 spring mechanisms operate with the sliding of the friction mechanism. In the standard range of engine speeds, the flywheel device operates according to the K+K1 characteristic, because no excessively great torque usually acts at the standard range of engine speeds. Because the friction mechanism does not slide at that time, the speed variation absorbing effect is greatly improved. When the engine speed approaches the resonance speed of the K+K1 characteristic at start-up or stopping of the engine, the torsional angle between the drive side and driven side flywheels increases. Thus, the K1 spring mechanism is more compressed, and the torque acting on the friction mechanism increases to finally cause the friction mechanism to slide. Upon sliding of the friction spring mechanism, the flywheel device changes its vibrational behavior from the K+K1 characteristic to the K characteristic by jumping over the resonance speed of the K+K1 characteristic. After the jumping, when the rotational speed changes away from the resonance speed of the K+K1 characteristic, the torsional angle between the drive side and driven side flywheels gradually decreases, and the sliding of the friction mechanism finally stops. Then, the flywheel device again operates according to the K+K1 characteristic. In this way, occurrence of resonance while the rotational speed of the flywheel device passes through the resonance speed of the K+K1 characteristic is prevented.

However, there are some problems to be solved in the above-described flywheel device having the momentarily sliding friction mechanism. Namely, the slide beginning or stopping point of the momentarily sliding friction mechanism may fluctuate due to a manufacturing tolerance of the friction mechanism and the abrasion of the abrasive member of the friction mechanism during use. Though it may be effective to provide some device to cause the friction mechanism to begin or stop sliding at a predetermined torsional angle, such a device would make the flywheel device large in size.

SUMMARY OF THE INVENTION

An object of the invention is to provide a torsional damper type flywheel device that uses a viscous damping mechanism for suppression of resonance in place of the momentarily sliding friction mechanism of the above-described flywheel device, to thereby assure a reliable operation and to enable a more effective absorption of rotational speed variation.

The above-described object can be attained by a torsional damper type flywheel device including a vibrational system therefor in accordance with the present invention.

The vibrational system of the invention generally includes two members defining moment of inertias, a first spring member connecting the moment of inertia defining members, a second spring member, and a viscous damping member arranged in series with the second spring member. The series combination of the second spring member and the viscous damping member is arranged parallel to the first spring member and connects the moment of inertia defining members.

The torsional damper type flywheel device includes two flywheels arranged coaxially with respect to each other and rotatable relative to each other, a first spring mechanism connecting the flywheels, a second spring mechanism, and a viscous damping mechanism arranged in series with the second spring mechanism. The series combination of the second spring mechanism and the viscous damping mechanism is arranged in series with the first spring mechanism and connects the flywheels.

The flywheel device is classified into the following four types:

a first type wherein the viscous damping mechanism includes a hydraulic damping mechanism;

a second type wherein the viscous damping mechanism includes a hydraulic damping mechanism and the flywheel device further includes a momentarily sliding friction mechanism;

a third type wherein the viscous damping mechanism includes an air damper mechanism; and a fourth type wherein the viscous damping mechanism includes an air damper mechanism and the flywheel device further includes a momentarily sliding friction mechanism.

The third and fourth types also may include a third spring mechanism arranged parallel to the first spring mechanism and parallel to the series combination of the second spring mechanism and the viscous damping mechanism.

The first, second, third, and fourth types will be explained in more detail hereinafter in the explanations of first, second, third, and fourth embodiments of the present invention, respectively.

In the above-described flywheel device in accordance with the present invention, the flywheel device continuously changes its vibrational behavior between two vibrational characteristics, that is, a K characteristic where only the first spring mechanism operates and a $K+K1$ characteristic where both the first and second spring mechanisms operate. When the relative rotational speed between the flywheels is very high and accordingly the viscous damping mechanism operates as if it were rigid, a characteristic near the $K+K1$ characteristic is obtained. On the contrary, when the relative rotational speed between the flywheels is very low and accordingly the viscous damping mechanism can stroke almost absolutely freely, a characteristic near the K characteristic is obtained. This continuous change of operational behavior due to the viscous damping mechanism prevents the flywheel device from encountering resonance in substantially the same manner that the momentarily sliding friction mechanism suppresses resonance of the flywheel device having the momentarily sliding friction mechanism. In addition, because the flywheel device does not use a continuously sliding friction mechanism, the speed variation and torque variation absorbing effect is greatly improved in comparison with the flywheel device having the continuously sliding friction mechanism.

BRIEF DESCRIPTION OF THE DRAWINGS

The above and other objects, features and advantages of the present invention will become more apparent and will be more readily appreciated from the following detailed description of the preferred exemplary embodiments of the invention taken in conjunction with the accompanying drawings, in which first, second, third and fourth embodiments are illustrated and members having similar structures are denoted with the same reference number throughout the four embodiments, and in which:

FIG. 9 is a an elevational view of a driven plate of a driven side flywheel of the flywheel device according to the first embodiment;

FIG. 12 an elevational view of a first control plate of the flywheel device according to the first embodiment, FIG. 12 being applicable to the second embodiment;

FIG. 14 is a cross-sectional view of the flywheel device of FIG. 13 taken along line XIV—XIV of FIG. 13;

FIG. 15 is a system diagram illustrating a vibrational system of the flywheel device in accordance with the second embodiment;

FIG. 19 is a cross-sectional view of a friction mechanism of the flywheel device according to the second embodiment;

FIG. 27 is an elevational view of a torsional damper type flywheel device in accordance with the fourth embodiment of the present invention;

FIG. 28 is a cross-sectional view of the flywheel device of FIG. 27 taken along line XXVIII—XXVIII of FIG. 27;

FIG. 29 is a system diagram illustrating a vibrational system of the flywheel device in accordance with the fourth embodiment;

DESCRIPTION OF THE PREFERRED EMBODIMENTS

Figure 1:
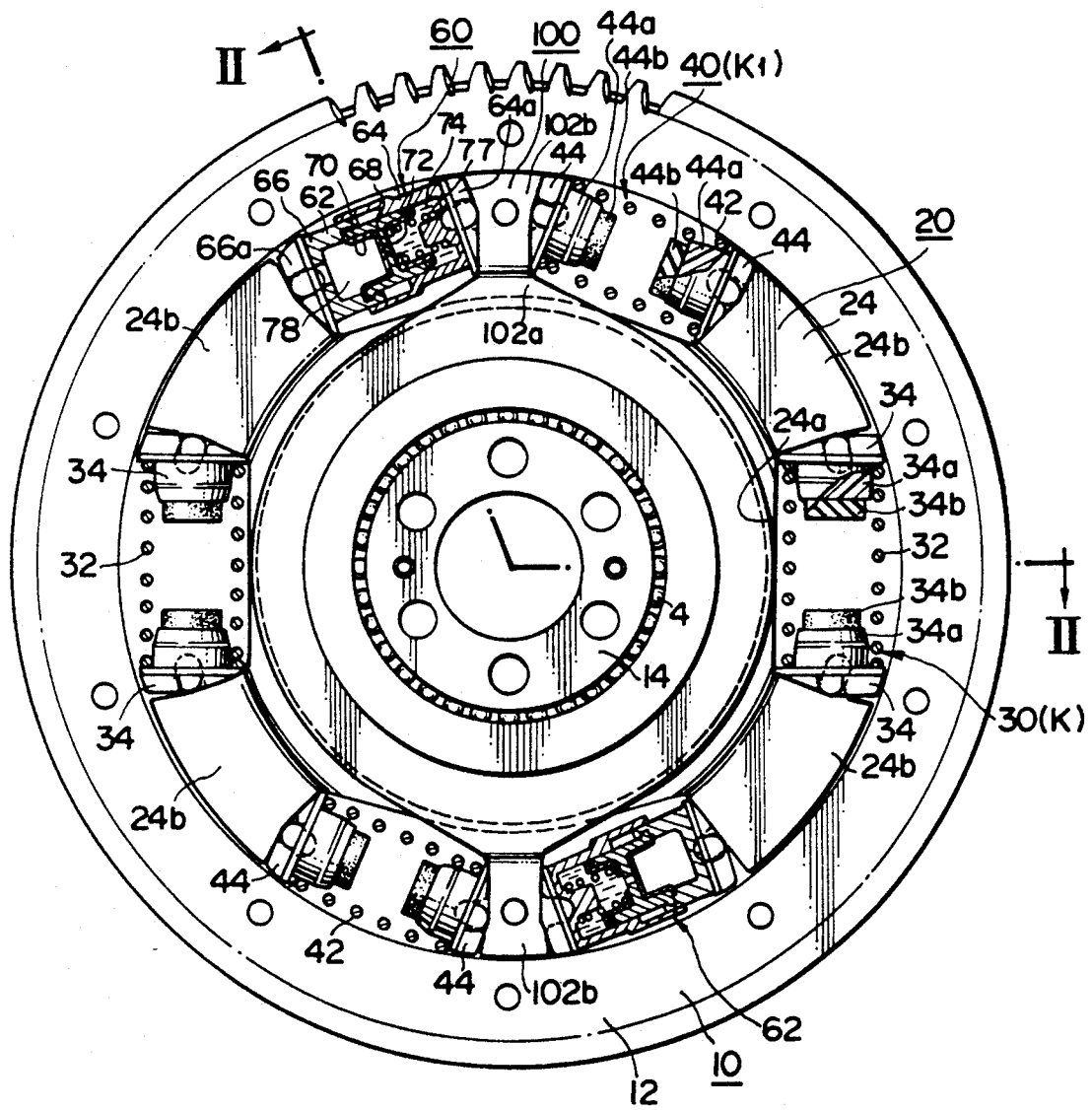
FIG. 1, is an elevational view of a torsional damper type flywheel device in accordance with the first embodiment of the present invention.

Four embodiments of the present invention will be explained. A first embodiment is illustrated in FIGS. 1-12; a second embodiment is illustrated in FIGS. 13-19, and FIGS. 5-8 and 10-12; a third embodiment is illustrated in FIGS. 20-26, and FIGS. 5, 7 and 8; and a fourth embodiment is illustrated in FIGS. 27-35, and FIGS. 5 and 24.

Every embodiment includes a vibrational system for a torsional damper type flywheel and a torsional damper type flywheel structure embodying the vibrational system. As shown in FIGS. 3, 15, 22, and 29, the vibrational system common to every embodiment includes two members defining moment of inertias I1 and I2 rotatable relative to each other, a first spring member K connecting the moment of inertia defining members, a second spring member K1 which may comprise a metal spring or an air cushion spring, and a viscous damping member V which may comprise a hydraulic damping member H or an airy damping member A. Second spring member K1 and viscous damping member V are arranged in series with each other. The series combination of second spring member K1 and viscous damping member V is arranged parallel to first spring member K and connects the moment of inertia defining members I1 and I2.

As shown in FIGS. 1, 13, 20, and 27, the torsional damper type flywheel structure common to every embodiment includes a drive side flywheel 10 and a driven side flywheel 20 arranged coaxially with respect to each other and rotatable relative to each other, a first spring mechanism 30 connecting drive side and driven side flywheels 10 and 20, a second spring mechanism 40 which may include a metal spring mechanism or an air cushion spring mechanism, and a viscous damping mechanism which may include a hydraulic damping mechanism 60 or an air damper mechanism 80. The viscous damping mechanism is arranged in series with second spring mechanism 40. The series combination of second spring mechanism 40 and the viscous damping mechanism is arranged parallel to first spring mechanism 30 as a vibrational system and connects the drive side and driven side flywheels 10 and 20.

Next, structures of each embodiment will be explained in more detail.

FIRST EMBODIMENT

Embodiment shown in FIGS. 1-12

Figure 3:
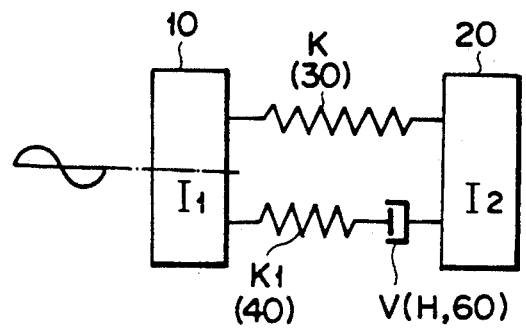
FIG. 3 is a system diagram illustrating a vibrational system of the flywheel device in accordance with the first embodiment.

As shown in FIG. 3, a vibrational system according to the first embodiment includes: the two members defining moment of inertias I1 and I2; first spring member K directly connecting the moment of inertia defining members I1 and I2; second spring member K1; and a hydraulic damping member H as the viscous damping member V arranged in series with second spring member K1. The series combination of second spring member K1 and hydraulic damping member H is arranged in parallel to first spring mechanism K and connects the moment of inertia defining members I1 and I2.

As shown in FIG. 1, in the torsional damper type flywheel device according to the first embodiment, the first spring mechanism 30 directly connects the drive and driven side flywheels 10 and 20, the second spring mechanism 40 includes a metal spring member, and the viscous damping mechanism comprises a hydraulic damping mechanism 60. Thus, the torsional damper type flywheel device of the first embodiment includes: drive side flywheel 10; driven side flywheel 20 arranged coaxially with respect to drive side flywheel 10 and rotatable relative to drive side flywheel 10; first spring mechanism 30 directly connecting the drive side and driven side flywheels 10 and 20; second spring mechanism 40 arranged parallel to first spring mechanism 30 as a spring arrangement; and hydraulic damping mechanism 60 arranged in series with second spring mechanism 40. The series combination of second spring mechanism 40 and hydraulic damping mechanism 60 is arranged parallel to first spring mechanism 30 as a vibrational system and connects the drive side and driven side flywheels 10 and 20.

Figure 2:
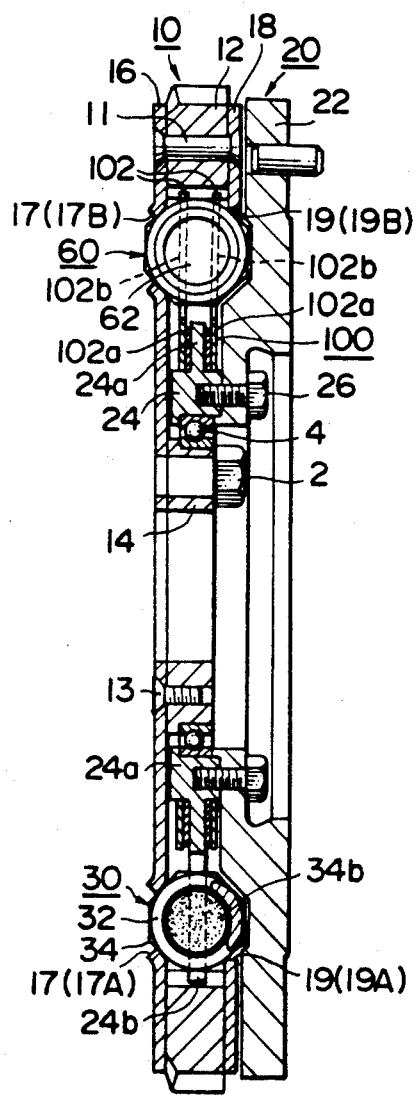
FIG. 2 is a cross-sectional view of the flywheel device of FIG. 1 taken along line II—II of FIG. 1.

Drive side flywheel 10 is coupled to an engine crankshaft (not shown) by bolts 2, and driven side flywheel 20 is coupled, for example, to a power train of a vehicle including a clutch. As shown in FIG. 2, driven side flywheel 20 is rotatably mounted to drive side flywheel 10 via a bearing member 4.

Figure 7:
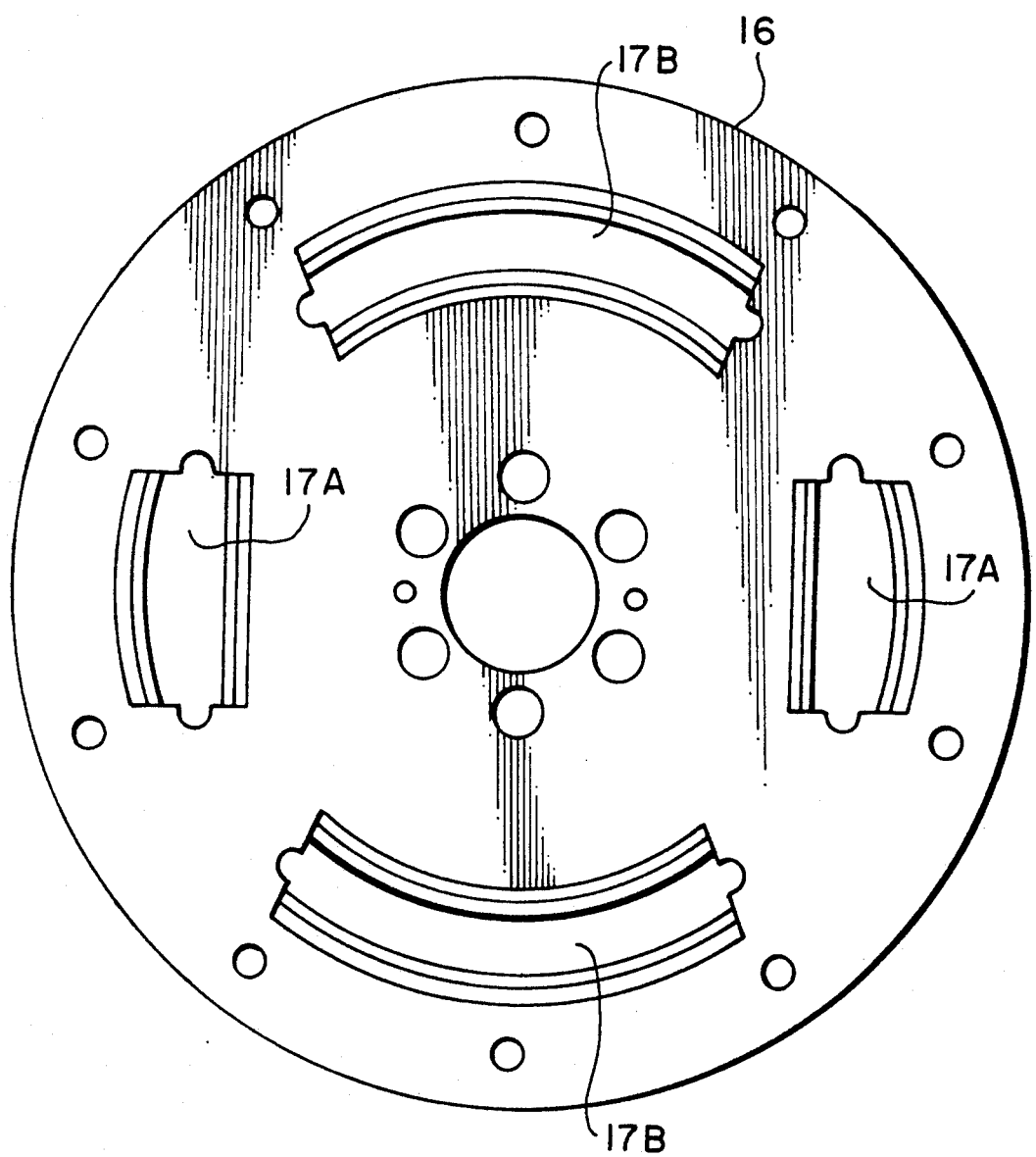
FIG. 7 is an elevational view of one of the drive plates of a drive side flywheel of the flywheel device according to the first embodiment, FIG. 7 being applicable to the second and third embodiments.
Figure 8:
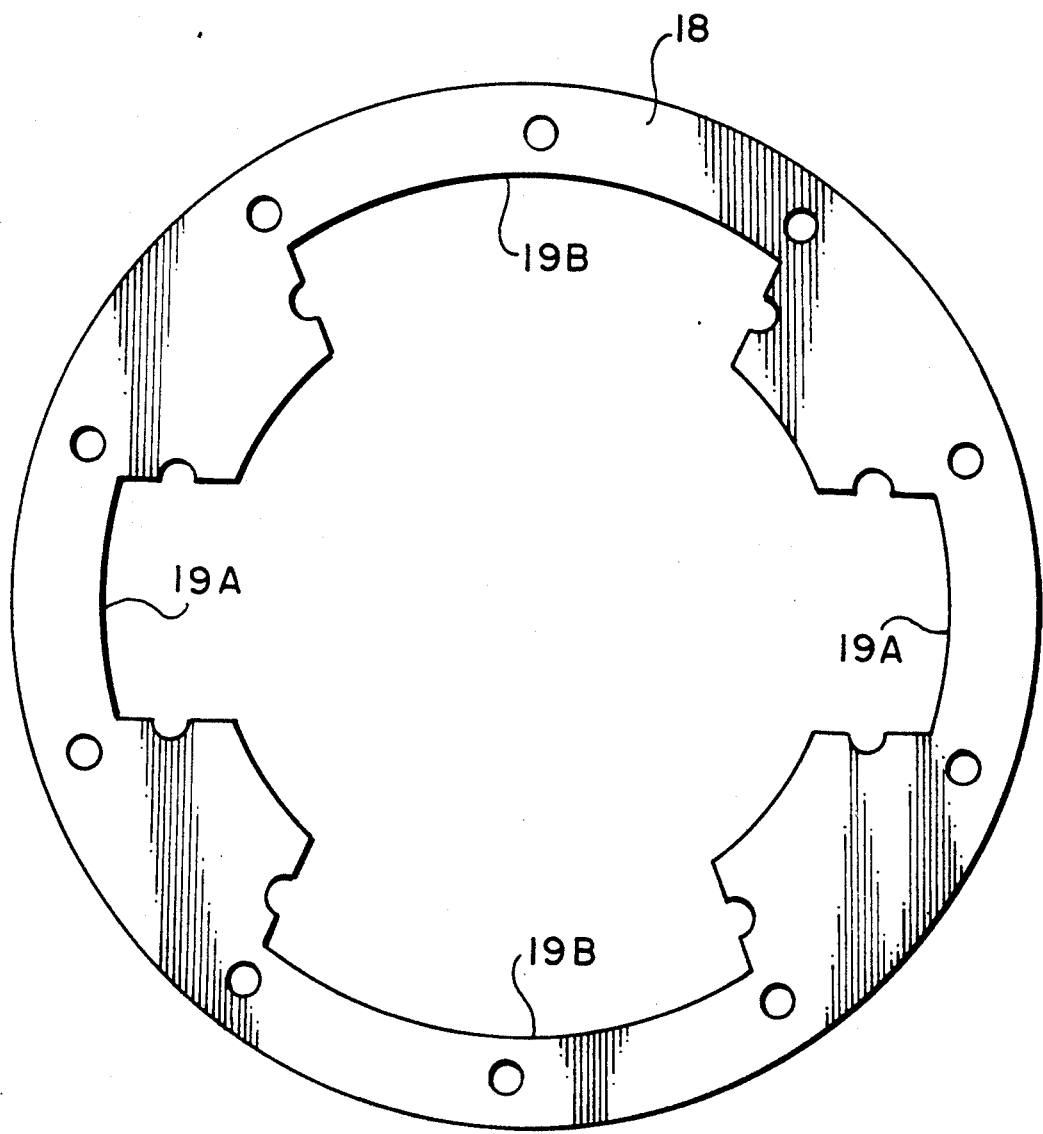
FIG. 8 is an elevational view of another of the drive plates of the drive side flywheel of the flywheel device according to the first embodiment, FIG. 8 being applicable to the second and third embodiments.

As shown in FIG. 2, drive side flywheel 10 includes an outer ring 12, an inner ring 14 disposed radially inside outer ring 12, and drive plates 16 and 18 disposed on opposite sides of outer ring 12 and fixed to outer ring 12 by a rivet 11. Inner ring 14 is fixed to one of the drive plates 16 by a bolt 13. As shown in FIGS. 7 and 8, one drive plate 16 has openings 17 formed therein including first openings 17A and second openings 17B, and the other drive plate 18 has slots 19 formed therein including first slots 19A and second slots 19B. Circumferential ends of first openings 17A and first slots 19A detachably engage first spring mechanism 30, and circumferential ends of second openings 17B and second slots 19B detachably engage the series combination of second spring mechanism 40 and hydraulic damping mechanism 60.

As shown in FIG. 2, driven side flywheel 20 includes a flywheel body 22 and a driven plate 24 fixed to flywheel body 22 via a bolt 26. As shown in FIG. 9, driven plate 24 includes an annular portion 24a and arms 24b extending radially outwardly from the annular portion 24a. As shown in FIG. 1, arms 24b of driven plate 24 detachably engage first spring mechanism 30 and the series combination of second spring mechanism 40 and hydraulic damping mechanism 60.

Figure 10:
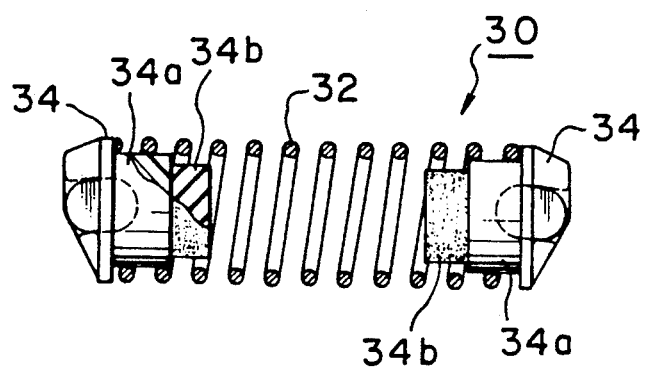
FIG. 10 is an enlarged, side view of a first spring mechanism of the flywheel device according to the first embodiment FIG. 10 being applicable to the second embodiment.

As shown in FIG. 10, first spring mechanism 30 includes at least one first coil spring 32 and spring seats 34 disposed at respective ends of first coil spring 32. Each of the spring seats 34 includes a hard synthetic resin portion 34a. At least one of the spring seats 34 disposed at the ends of first coil spring 32 also includes an elastic cushion 34b fixed to the hard synthetic resin portion 34a so as to oppose an opposite spring seat. As shown in FIG. 2, first spring mechanism 30 is disposed in first opening 17A formed in drive plate 16 and first slot 19A formed in drive plate 18.

Figure 11:
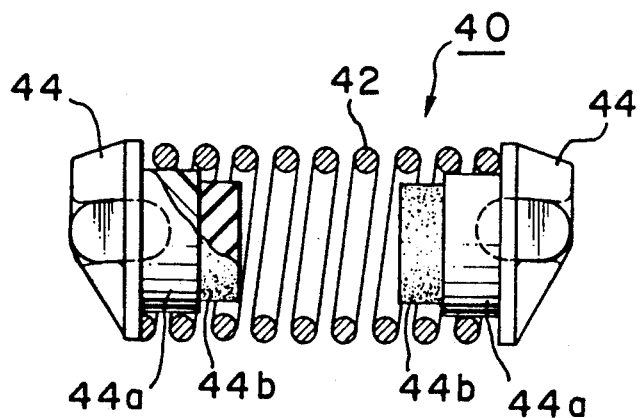
FIG. 11 is an enlarged, side view of a second spring mechanism of the flywheel device according to the first embodiment, FIG. 11 being applicable to the second embodiment.

Similarly, as shown in FIG. 11, second spring mechanism 40 includes at least one second coil spring 42 and spring seats 44 disposed at respective ends of second coil spring 42. Each of the spring seats 44 includes a hard synthetic resin portion 44a. At least one of the spring seats 44 disposed at the ends of second coil spring 42 also includes an elastic cushion 44b fixed to the hard synthetic resin portion 44a so as to oppose an opposite spring seat.

As shown in FIGS. 1 and 2, first control plate 100 is provided rotatably relative to the drive side and driven side flywheels 10 and 20. First control plate 100 connects second spring mechanism 40 and hydraulic damping mechanism 60. As shown in FIG. 2, first control plate 100 includes a pair of first control plate elements 102. As shown in FIG. 12, each of the first control plate elements 102 includes an annular portion 102a and arms 102b extending radially outwardly from annular portion 102a of first control plate 100. Arms 102b of first control plate 100 connect second spring mechanism 40 and hydraulic damping mechanism 60 so that second spring mechanism 40 and hydraulic damping mechanism 60 are arranged in series with each other. The series combination of second spring mechanism 40 and hydraulic damping mechanism 60 is disposed in second opening 17B formed in drive plate 16 and second slot 19B formed in drive plate 18.

Hydraulic damping mechanism 60 includes at least one hydraulic damper 62. In the embodiment of FIG. 1, hydraulic damping mechanism 60 includes two hydraulic dampers 62.

Figure 6:
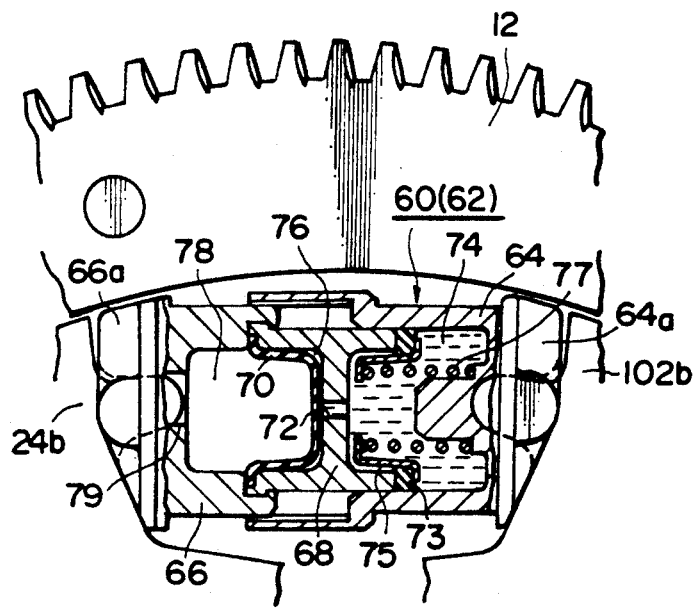
FIG. 6 is a cross-sectional view of a hydraulic damper of the flywheel device of the first embodiment, FIG. 6 being applicable to the second embodiment.

As shown in FIG. 6, the hydraulic damper 62 includes first and second outer cylinders 64 and 66 axially movable relative to each other, an inner cylinder 68 fixed to second outer cylinder 66 and axially slidable relative to first outer cylinder 64, and a diaphragm 70 disposed on a side of inner cylinder 68 closer to second outer cylinder 66. Inner cylinder 68 has an orifice 72 formed therein. Inner cylinder 68 and first outer cylinder 64 define a first chamber 74 therein, and inner cylinder 64 and diaphragm 70 define a second chamber 76 therein. First and second chambers 74 and 76 are filled with liquid such as oil and communicate with each other through orifice 72 formed in inner cylinder 68 so that orifice 72 generates a viscous damping when the liquid flows through orifice 72. Diaphragm 70 and second outer cylinder 66 define an air chamber 78 therein. Second outer cylinder 66 has a hole 79 formed therein which penetrates the wall of second outer cylinder. Air chamber 78 communicates with the environment through hole 79 formed in second outer cylinder 66. A return spring 77 is disposed in the first chamber 74 and biases inner cylinder 68 in a direction away from first outer cylinder 64. A spring seat member 75 is disposed in first chamber 74 and supports one end of return spring 77. A seal member 73 is also provided slidably relative to first outer cylinder 64 and seals a sliding clearance between inner cylinder 68 and first outer cylinder 64, Seal member 73 is held between inner cylinder 68 and spring seat member 75 biased by return spring 77 toward inner cylinder 68. First and second outer cylinders 64 and 66 have end portions 64a and 66a, respectively, having contours similar to spring seats 44 disposed at the ends of second coil spring 42 of second spring mechanism 40.

Next, characteristics and operation of the vibrational system and the flywheel device according to the first embodiment will be explained.

Under acceleration, a torque acting on drive side flywheel 10 from the engine crankshaft is transmitted to driven side flywheel 20 via two torque transmitting paths, namely, a path including first spring mechanism 30 and a path including the series combination of second spring mechanism 40 and hydraulic damping mechanism 60. Under deceleration, a torque is transmitted from driven side flywheel 20 to drive side flywheel 10 via the two paths.

Figure 4:
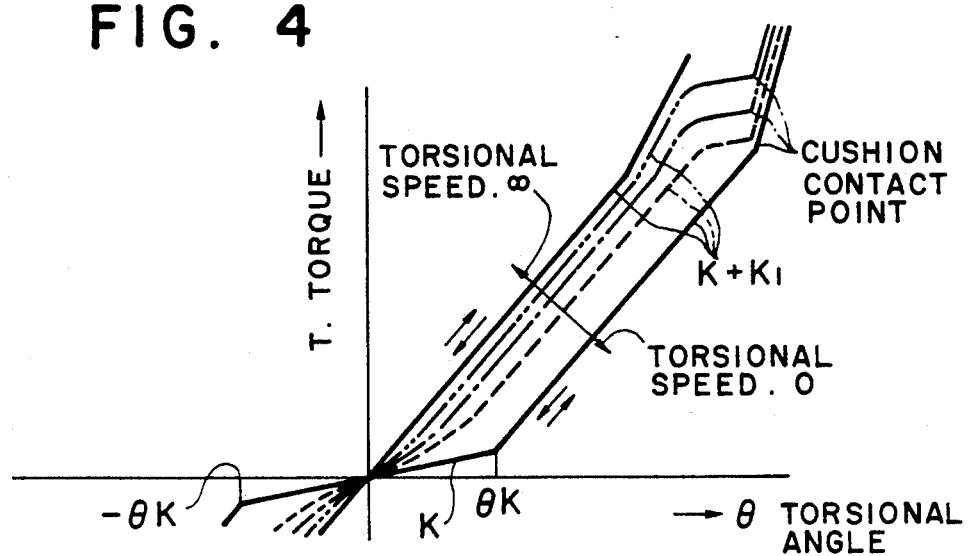
FIG. 4 is a diagram illustrating a torsional angle-torque characteristic of the flywheel device of the first embodiment.

FIG. 4 illustrates the relationship between a relative torsional angle $\theta$ between the drive side and driven side flywheels 10 and 20 and a torque T transmitted between the drive side and driven side flywheels 10 and 20. It should be understood that the characteristics of the negative region is symmetric to those of the positive region with respect to the zero point in FIG. 4, though only the positive region is fully illustrated. Because the vibrational system includes hydraulic damping mechanism 60, the torque changes corresponding to a torsional speed s between the drive side and driven side flywheels 10 and 20. When the torsional speed s is excessively high, orifice 72 generates an excessively large viscous damping force and hydraulic damping mechanism 60 operates rigidly. In such a condition, both the first and second spring mechanism 30 and 40 operate and a K+K1 characteristic is obtained. In this instance, K is a spring constant of first spring mechanism 30; K1 is a spring constant of second spring mechanism 40; and K+K1 is a synthetic spring constant of the first and second spring constants. On the contrary, when the torsional speed s is very small or zero, the hydraulic damping mechanism 60 strokes freely and makes second spring mechanism 40 ineffective. When the torsional speed s is equal to zero, at torsional angles from a zero torsional angle to a torsional angle $\theta k$ corresponding to the maximum stroke of the hydraulic damping mechanism 60, only the first spring mechanism 30 operates, and at tosional angles above the angle $\theta k$, both the first and second spring mechanisms 30 and 40 operate.

Because hydraulic damping mechanism 60 operates between the above-described two extreme cases, the flywheel device transmits the torque between the drive side and driven side flywheels 10 and 20 along a broken line, a dotted chain line and a two-dotted chain line as shown in FIG. 4, corresponding to the torsional speed s. The higher the torsional speed s is, the more effectively damping mechanism 60 transmits the torque, and therefore, second spring mechanism 40 begins to operate at a smaller torsional angle. Each of the characteristic lines has a bent point t above which the characteristic line extends with a steeper inclination. At the point t, cushions 44b of spring seats 44 of second spring mechanism 40 are brought into contact with each other and cushions 34b of spring seats 34 of first spring mechanism 30 are brought into contact with each other at the same time. The spring constant of the cushions 44b and 34b are higher than those of the first and second coil springs 32 and 42.

Figure 5:
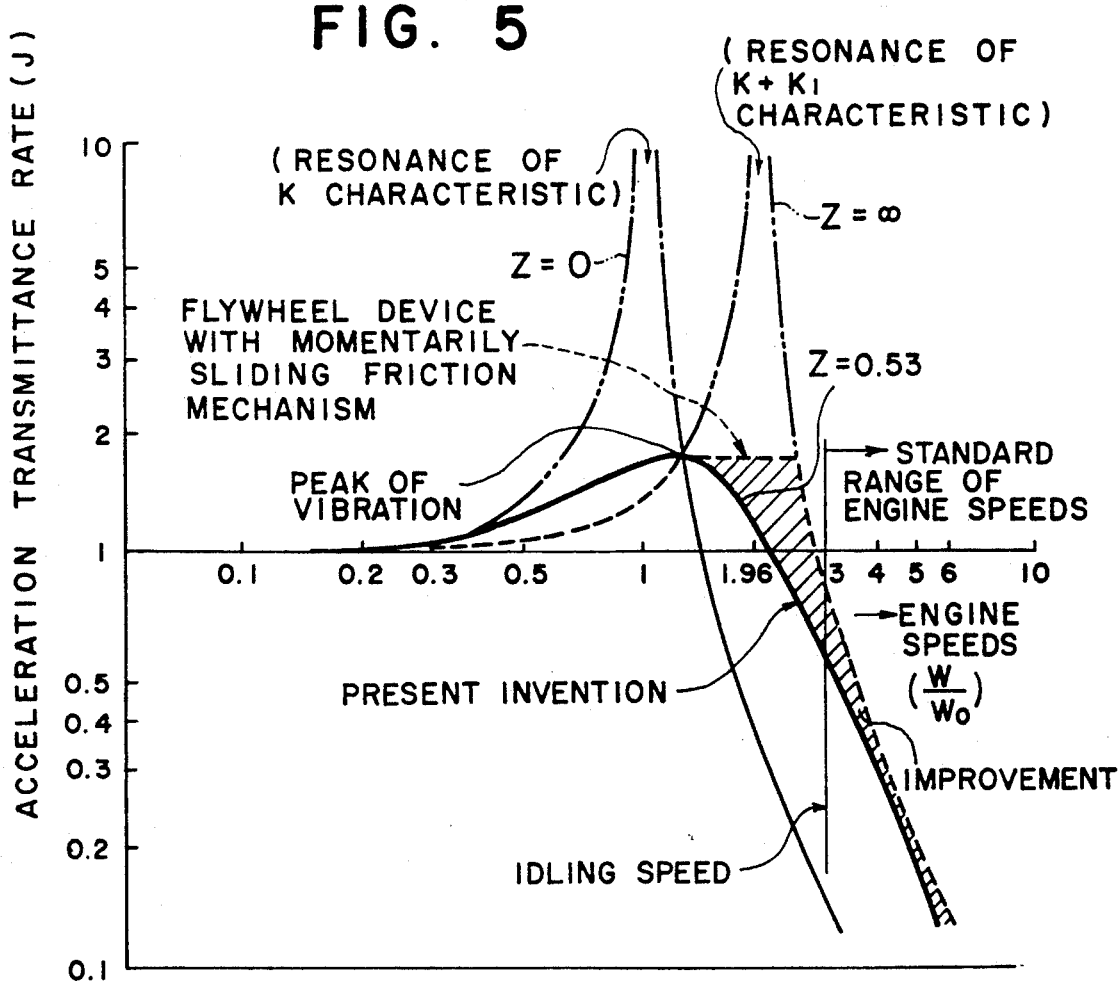
FIG. 5 is a graph illustrating a rotational speed-acceleration transmittance rate characteristic of the flywheel device according to the first embodiment, FIG. 5 being applicable to the second, third and fourth embodiments.

FIG. 5 illustrates an engine speed-acceleration transmittance rate characteristic of the flywheel device according to the first embodiment. In FIG. 5, $w/w_0$ illustrates a ratio of an engine speed w to the resonance speed $w_0$ of the system. It is to be understood that the smaller the acceleration transmittance rate J is, the greater the speed variation or torque variation absorbing effect is. The actual characteristic of the flywheel device of the present invention is shown by a full line in FIG. 5 and is positioned between two characteristics shown by two-dotted chain lines, that is, a K characteristic where hydraulic damping mechanism 60 strokes absolutely freely and only the first spring mechanism 30 operates, and a K+K1 characteristic where hydraulic damping mechanism 60 is perfectly rigid and both the first and second spring mechanisms 30 and 40 operate. The characteristic of the present invention as shown by the full line in FIG. 5 illustrates the characteristic in the case where the viscous damping coefficient z of hydraulic damping mechanism 60 relative to the critical damping coefficient thereof is 0.53. In FIG. 5, a broken line illustrates the characteristic of the flywheel device not having a viscous damping mechanism but having a momentarily sliding friction mechanism which was discussed, for the purpose of comparison. As will be understood from FIG. 5, the vibrational peak point of the flywheel device of the present invention is positioned near the speed of $w/w_0=1.3$, and the magnitude is substantially equal to that of the flywheel device having only the momentarily sliding friction mechanism. This means that in the present invention, resonance of the flywheel device while passing through the resonance speed is effectively suppressed like in the flywheel device having only the momentarily sliding friction mechanism. The difference between the flywheel device having hydraulic damping mechanism 60 of the present invention and the flywheel device having only the momentarily sliding friction mechanism is that the flywheel device having hydraulic damping mechanism 60 continuously changes its vibrational behavior between the K characteristic and the K+K1 characteristic, while the flywheel device having only the momentarily sliding friction mechanism almost non-continuously changes its behavior between the K characteristic and the K+K1 characteristic with the sliding of the friction mechanism. As is seen in FIG. 5, the characteristic line of the flywheel device of the present invention extends below that of the flywheel device having only the momentarily sliding friction mechanism in the standard range of engine speeds above the engine idling speed. This means that the speed variation or torque variation absorbing effect is more improved in the present invention than in the flywheel device having only the momentarily sliding friction mechanism. The hatched portion of FIG. 5 illustrates this improvement.

SECOND EMBODIMENT shown in FIGS. 13-19, and also in FIGS. 5-8, and 10-12

The vibrational system and flywheel device according to the second embodiment further includes a momentarily sliding friction mechanism in comparison with the first embodiment. More particularly, as shown in FIG. 15, a vibrational system for a torsional damper type flywheel device according to the second embodiment includes the two members defining moment of inertias I1 and I2, first spring member K directly connecting the moment of inertia defining members I1 and I2, second spring member K1, hydraulic damping member H as viscous damping member V arranged in series with second spring member K1, and a friction member F arranged in series with the series combination of second spring member K1 and hydraulic damping member H. The series combination of second spring member K1, hydraulic damping member H and friction member F is arranged parallel to first spring member K and connects the moment of inertia defining members I1 and I2.

Figure 13:
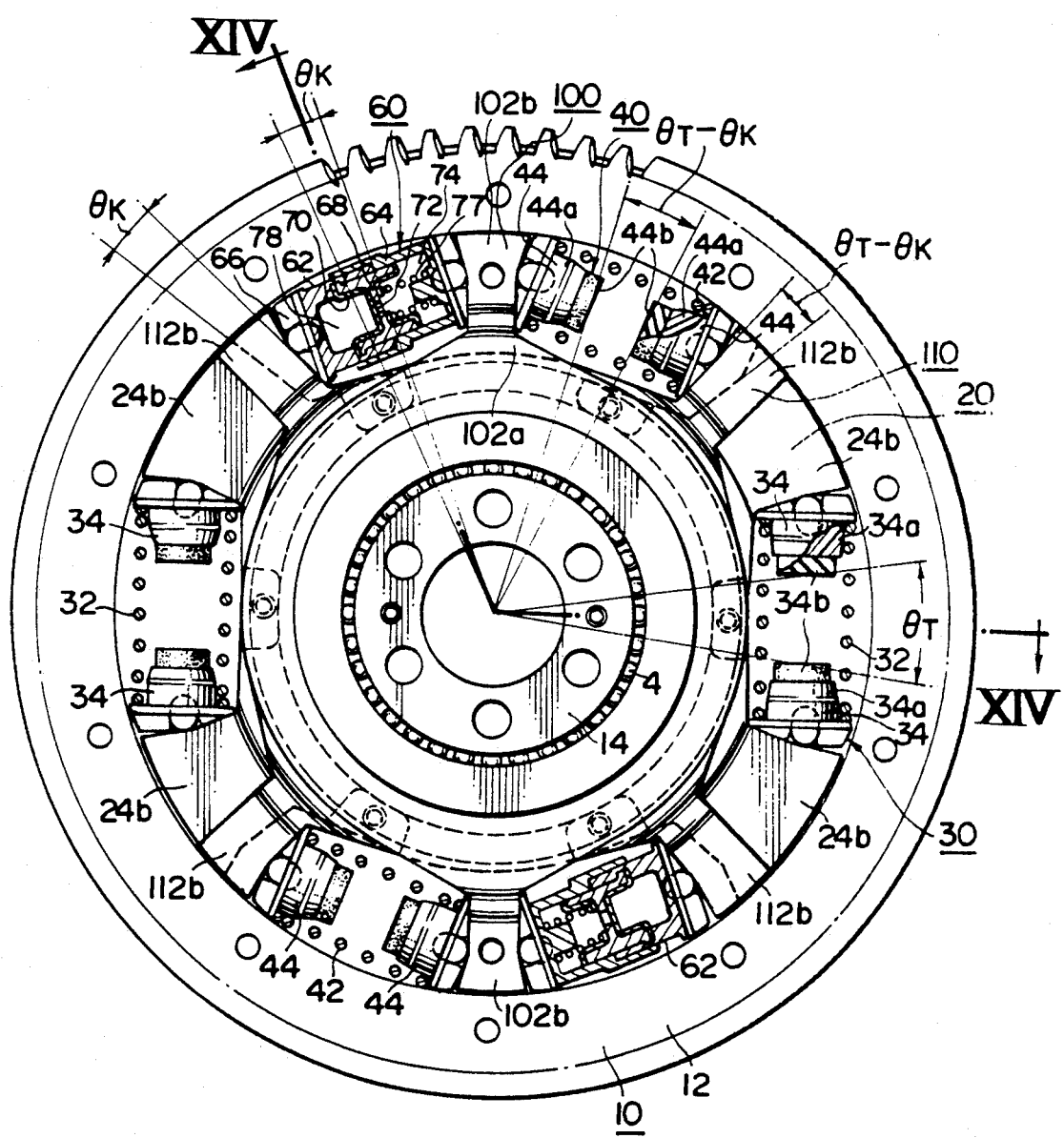
FIG. 13 is an elevational view of a torsional damper type flywheel device in accordance with the second embodiment of the present invention.

As shown in FIGS. 13 and 14, a torsional damper type flywheel device according to the second embodiment includes drive side flywheel 10, driven side flywheel 20 arranged coaxially with respect to drive side flywheel 10 and rotatable relative to drive side flywheel 10, first spring mechanism 30 directly connecting the drive side and driven side flywheels 10 and 20, second spring mechanism 40 arranged parallel to first spring mechanism 30 as a spring arrangement, hydraulic damping mechanism 60 arranged in series with second spring mechanism 40, and a friction mechanism 130 arranged in series with the series combination of second spring mechanism 40 and hydraulic damping mechanism 60. The series combination of second spring mechanism 40, hydraulic damping mechanism 60 and friction mechanism 130 is arranged parallel to first spring mechanism 30 as a vibrational system and connects the drive side and driven side flywheels 10 and 20.

Second spring mechanism 40 and hydraulic damping mechanism 60 are connected to each other via a first control plate 100 like the first embodiment. Structures of drive side flywheel 10, driven side flywheel 20, first spring mechanism 30, second spring mechanism 40, and first control plate 100 of the flywheel device according to the second embodiment are the same as the structures of the drive side flywheel 10, the driven side flywheel 20, the first spring mechanism 30, the second spring mechanism 40, and the first control plate 100, respectively, of the flywheel device according to the first embodiment explained above, except that the driven plate 24 of driven side flywheel 20 of the second embodiment has the contour shown in FIG. 17 while the driven plate 24 of the first embodiment has the contour shown in FIG. 9. However, all the explanations made about the drive side flywheel 10, the driven side flywheel 20 including driven plate 24, the first spring mechanism 30, and first control plate 100 of the first embodiment are applicable to the respective structures of the second embodiment. Further, the annular portion 24a (see FIG. 17) of driven plate 24 of the second embodiment slidably contacts friction mechanism 130.

Also, structures of hydraulic damping mechanism 60 including hydraulic damper 62 of the flywheel device of the second embodiment are the same as the structures of the hydraulic damping mechanism 60 including the hydraulic damper 62 of the flywheel device according to the first embodiment explained above. All the explanations made about the hydraulic damping mechanism 60 including the hydraulic damper of the first embodiment with reference to FIG. 6 are applicable to the respective structure of the second embodiment.

As compared with the flywheel device of the first embodiment, the flywheel device of the second embodiment further includes friction mechanism 130 and a second control plate 110.

Figure 18:
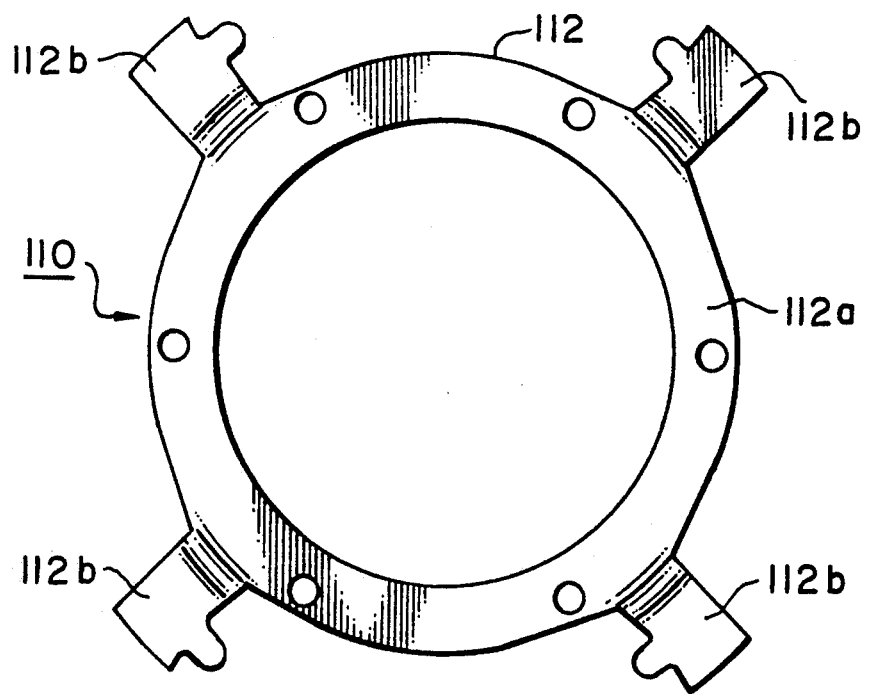
FIG. 18 is an elevational view of a second control plate of the flywheel device according to the second embodiment.

Second control plate 110 is rotatable relative to the drive side and driven side flywheels 10 and 20 and relative to first control plate 100. As shown in FIG. 14, second control plate 110 is disposed between hydraulic damping mechanism 60 and friction mechanism 130. As shown in FIG. 18, second control plate 110 includes a pair of second control plate elements 112. Each of the second control plate elements 112 includes an annular portion 112a and arms 112b extending radially outwardly from annular portion 112a of second control plate 110. Annular portion 112a of second control plate 110 slidably engages the friction mechanism 130, and arms 112b of second control plate 110 detachably engages the series combination of hydraulic damping mechanism 130 and second spring mechanism 40.

As shown in FIG. 19, friction mechanism 130 includes a thrust plate 132 rotatable relative to the drive side and driven side flywheels 10 and 20, a thrust lining 134 constructed of abrasive material and preferably coupled to thrust plate 132, and a cone spring 136 generating an axial biasing force when cone spring 136 is elastically deformed. Thrust plate 132, thrust lining 134 and cone spring 136 are disposed between annular portion 112a of second control plate 110 and annular portion 24a of driven plate 24 of driven side flywheel 20 so that cone spring 136 is compressed so as to generate a predetermined frictional force Fr of friction mechanism 130.

The function and operation of the flywheel device according to the second embodiment will be explained.

Figure 16A:
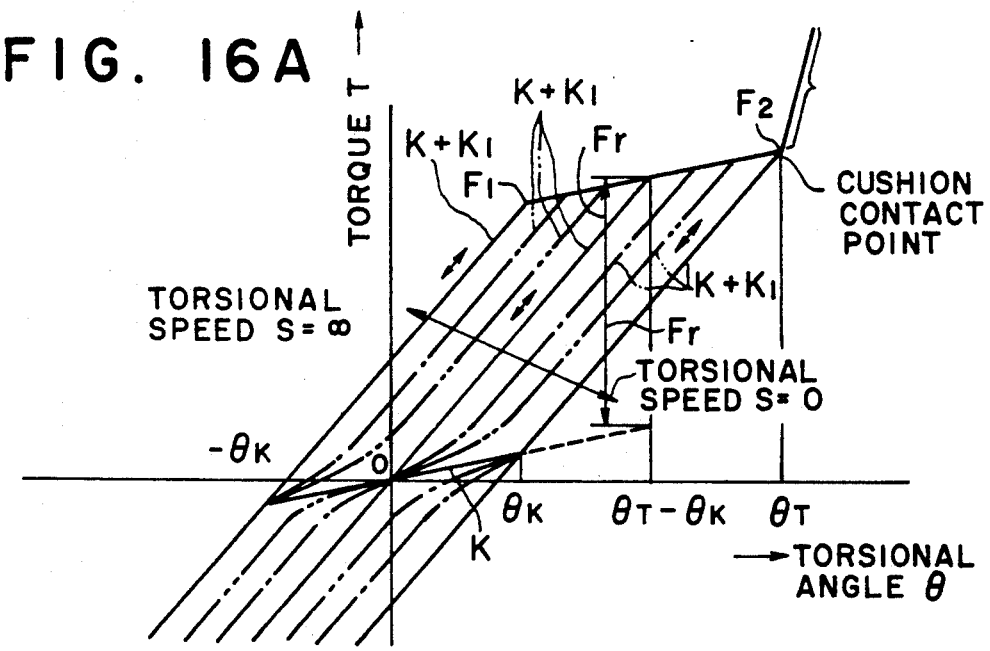
FIG. 16A is a diagram illustrating a torsional angle-torque characteristic of the flywheel device of the second embodiment.
Figure 16B:
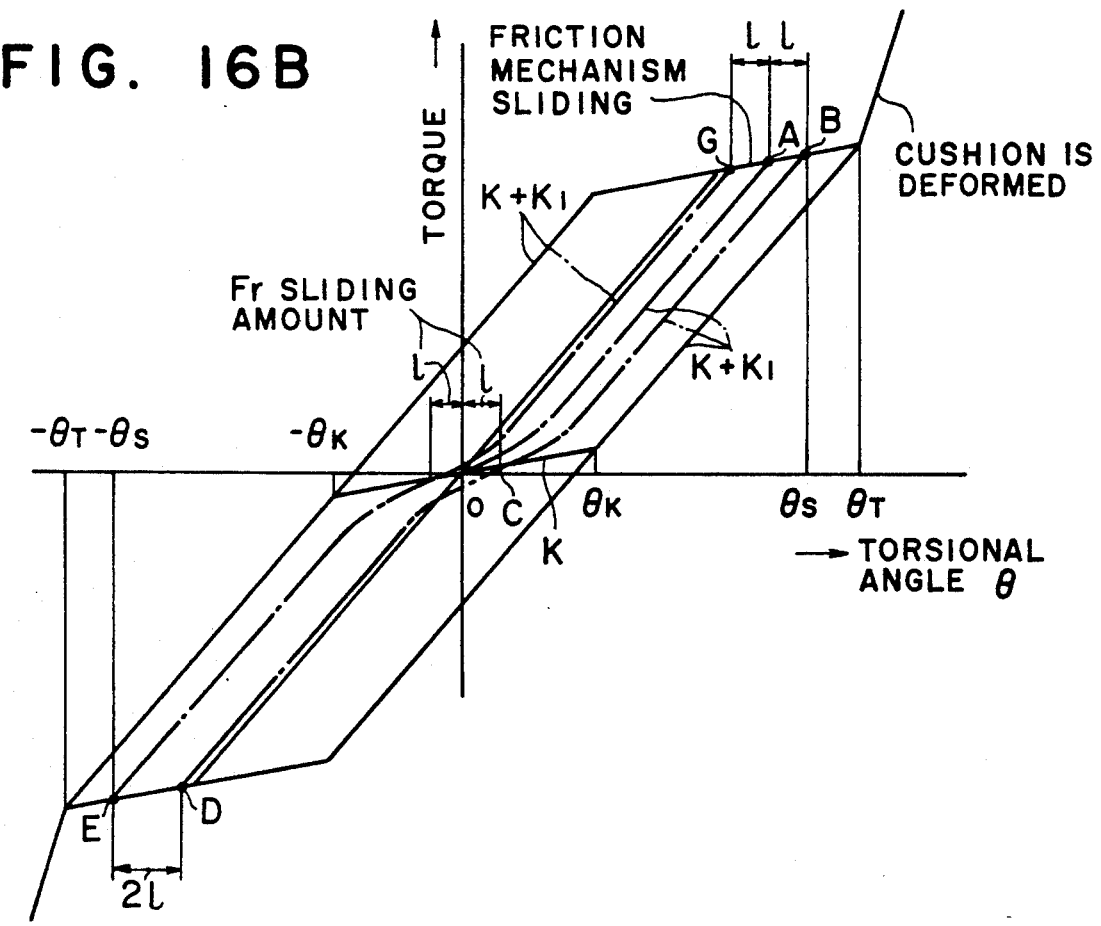
FIG. 16B is a diagram illustrating a torsional angle-torque characteristic in an actual operation in the flywheel device of the second embodiment.
Figure 17:
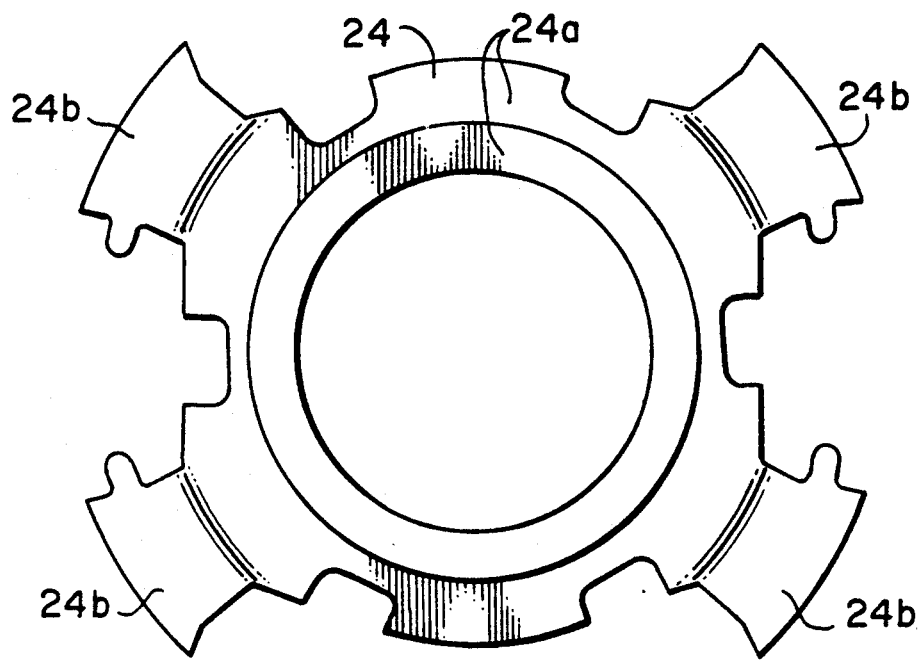
FIG. 17 is an elevational view of a driven plate of the flywheel device according to the second embodiment.

As shown in FIGS. 16A and 16B, because the vibrational system and flywheel device of the second embodiment includes friction mechanism 130 which begins to slide when the torque force acting on friction mechanism 130 exceeds the predetermined frictional force Fr of friction mechanism 130, the transmitted torque is limited by a line connecting points F1 and F2 (see FIG. 16A) on which friction mechanism 130 slides, unlike the torque characteristic of the first embodiment shown in FIG. 4. In actual operation, as shown in FIG. 16B, the transmitted torque changes along a hysteresis loop defined by points 0, A, B, C, D, E, F, A, B in order. On the line portions between points A and B, between points D and E, and between points G and B, the friction mechanism 130 momentarily slides. The sliding amount 1 of the friction mechanism 130 changes corresponding to the amount of the input torque variation. Point F2 in FIG. 16A illustrates a point where every cushion of every spring seat of every spring mechanism are brought into contact with an opposing spring seat.

With respect to the engine speed-acceleration transmittance rate characteristic, substantially the same characteristic as that of the first embodiment as was explained with reference to FIG. 5 is also obtained with the second embodiment.

The difference between the second embodiment and the first embodiment is that, in the second embodiment, not only the damping force of hydraulic damping mechanism 60 but also the damping force due to friction mechanism 130 operates on the flywheel device. Accordingly, a more quick and effective damping or absorption than in the first embodiment is obtained in the speed variation and torque variation. Further, because of the above-described torque limitation due to friction mechanism 130, an excessively large force exceeding the predetermined frictional force Fr of friction mechanism 130 does not act on hydraulic damping mechanism 60 at a range below the torsional angle $\theta_T$ (see FIG. 16A). In this connection, $\theta_T$ illustrates the angle where every cushion is brought into contact with the opposing spring seat. Thus, hydraulic damper 62 is protected from an excessively large torque.

THIRD EMBODIMENT shown in FIGS. 20-26 and also in FIGS. 5, 7 and 8

Figure 22:
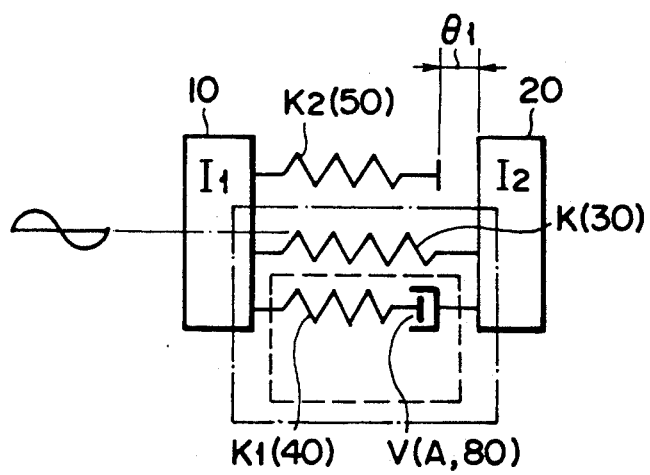
FIG. 22 is a system diagram illustrating a vibrational system of the flywheel device in accordance with the third embodiment.

In the third embodiment, the viscous damping mechanism includes an air damper mechanism. More particularly, as shown in FIG. 22, a vibrational system for a torsional damper type flywheel device according to the third embodiment includes the two members defining moment of inertias I1 and I2, first spring member K connecting the moment of inertia defining members I1 and I2, and a spring and viscous damping member A connecting the moment of inertia defining members I1 and I2. The spring and viscous damping member A includes a second spring member K1 of an air cushion operating parallel to first spring member K and a viscous damping member V operating in series with second spring member K1, when the spring and viscous damping member A strokes. Therefore, in the vibrational system of the third embodiment, second spring member K1 and viscous damping member V are included in the spring and viscous damping member A.

As also shown in FIG. 22, the vibrational system of the third embodiment may further include a third spring member K2 arranged parallel to first spring member K and the series combination of second spring member K1 and viscous damping member V. Third spring member K2 connects the moment of inertia defining members I1 and I2 with a predetermined gap $\theta 1$.

Figure 20:
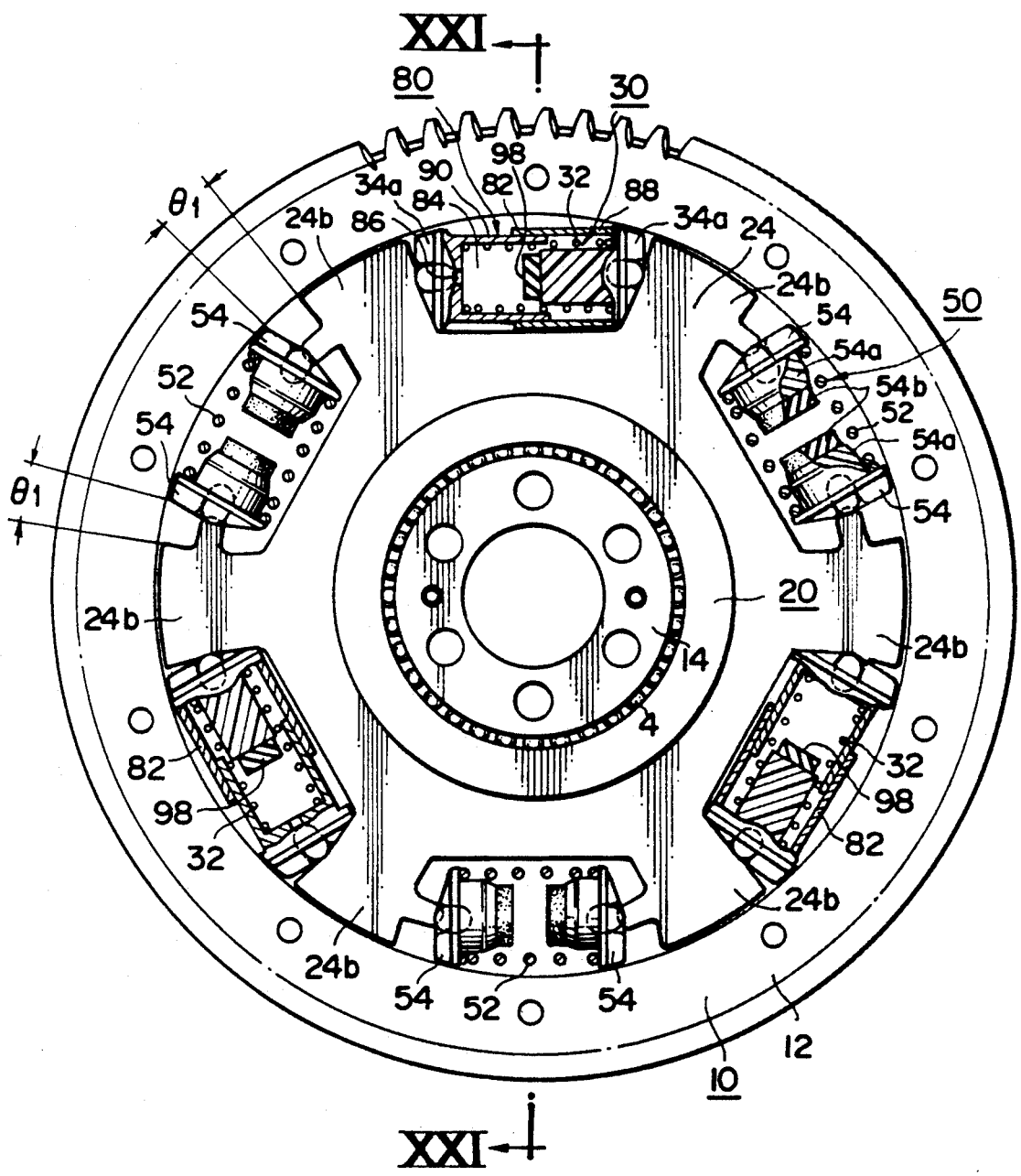
FIG. 20 is an elevational view of a torsional damper type flywheel device in accordance with the third embodiment of the present invention.
Figure 21:
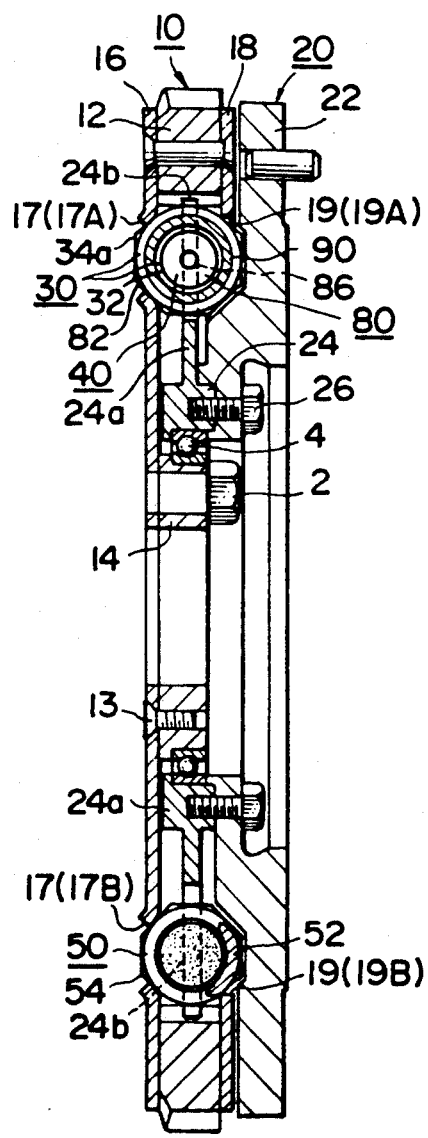
FIG. 21 is a cross-sectional view of the flywheel device of FIG. 20 taken along line XXI—XXI of FIG. 20.

As shown in FIGS. 20 and 21, a torsional damper type flywheel according to the third embodiment includes: drive side flywheel 10, driven side flywheel 20 arranged coaxially with respect to drive side flywheel 10 and rotatable relative to drive side flywheel 10, first spring mechanism 30 connecting the drive side and driven side flywheels 10 and 20, and an air damper mechanism 80 connecting the drive side and driven side flywheels 10 and 20. Air damper mechanism 80 includes at least one air damper 82 defining an air chamber 84 therein and having an orifice 86. Air damper mechanism 80 includes second spring mechanism 40 whose spring force comprises an air cushion force generated in air chamber 84 of every air damper 82 and a viscous damping mechanism whose damping force is generated by orifice 86 of every air damper 82. Second spring mechanism 40 and the viscous damping mechanism are arranged in series with each other as a vibrational system, and the series combination of second spring mechanism 40 and the viscous damping mechanism are arranged parallel to first spring mechanism 30 as a vibrational system.

Figure 25:
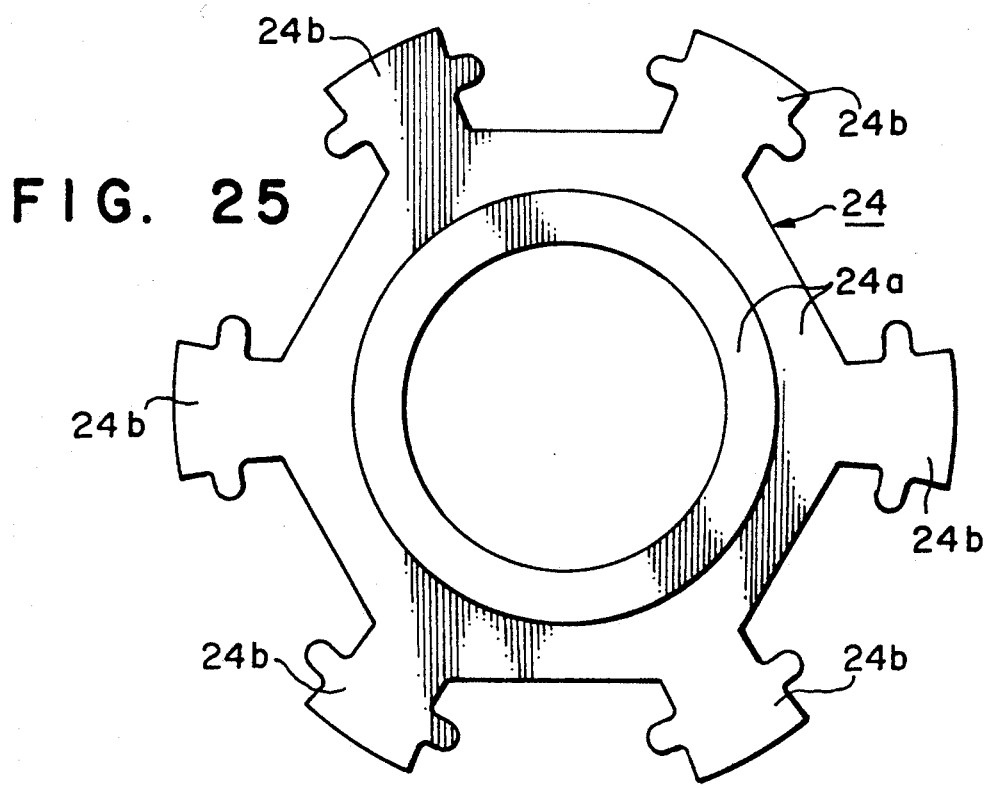
FIG. 25 is an elevational view of a driven plate of the flywheel device according to the third embodiment.

As shown in FIGS. 7, 8 and 25, the structures of drive side flywheel 10 and driven side flywheel 20 of the third embodiment are the same as those of drive side flywheel 10 and driven side flywheel 20, respectively, of the first embodiment except that the circumferential ends of second openings 17A and slots 19A detachably engage air damper mechanism 80, and arms 24b of driven plate 24 detachably engage air damper mechanism 80. Except these different points, all the explanations made in the first embodiment with respect to the drive side and driven side flywheels 10 and 20 of the first embodiment are applicable to the respective structures of the third embodiment.

Figure 24:
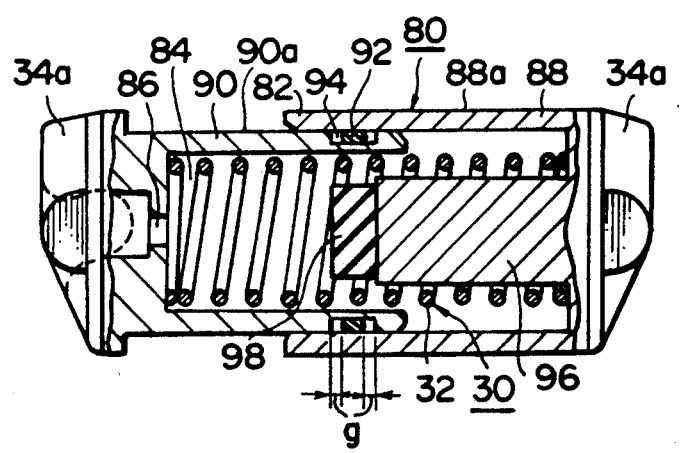
FIG. 24 is a cross-sectional view of an air damper of the flywheel device of the third embodiment, FIG. 24 being applicable to the fourth embodiment.

As shown in FIG. 24, first spring mechanism 30 includes at least one first coil spring 32. First coil spring 32 is housed in air chamber 84 of air damper 82 and also operates as a return spring of the air damper 82.

As shown in FIG. 24, air damper 82 includes an outer cylinder 88 including an end portion 34a and a cylindrical portion 88a, an inner cylinder 90 including an end portion 34a and a cylindrical portion 90a, and a seal ring 92. Inner cylinder 90 is axially slidable relative to outer cylinder 88 and defines air chamber 84 of air damper 82 therein in cooperation with outer cylinder 88. Seal ring 92 is disposed between cylindrical portion 88a of outer cylinder 88 and cylindrical portion 90a of inner cylinder 90. Inner cylinder 90 has a groove 94 formed in cylindrical portion 90a of inner cylinder 90 and circumferentially extending over an entire circumference of cylindrical portion 90a of inner cylinder 90. Seal ring 92 is fitted in groove 94. Seal ring 92 is slidably pressed against an inside surface of cylindrical portion 88a of outer cylinder 88 and loosely contacts an outside surface of cylindrical portion 90a of inner cylinder 90. There is a gap g between seal ring 92 and at least one side surface of groove 94. Air damper 82 further includes an axially extending pillar 96 formed in at least one of end portion 34a of outer cylinder 88 and end portion 34a of inner cylinder 90. A cushion 98 constructed of elastic material such as rubber is fixed to the end of pillar 96. End portion 34a of outer cylinder 88 and end portion 34a of inner cylinder 90 also constitute spring seats for first coil spring 32 of first spring mechanism 30.

As shown in FIGS. 20 and 21, the flywheel device according to the third embodiment may further include a third spring mechanism 50 arranged parallel to first spring mechanism 30 and parallel to the series combination of the second spring mechanism 40 of air cushion and the viscous damping mechanism. Third spring mechanism 50 connects the drive side and driven side flywheels 10 and 20 with a predetermined gap θ1. Though third spring mechanism 50 is not absolutely necessary, it is preferable to provide third spring mechanism 50, because the spring force of air cushion of the second spring mechanism may be insufficient in a high torque condition.

Figure 26:
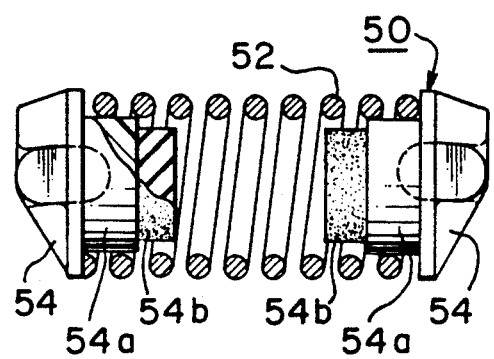
FIG. 26 is a cross-sectional view of a third spring mechanism of the flywheel device of the third embodiment.

As shown in FIG. 26, third spring mechanism 50 includes at least one third coil spring 52 and spring seats 54 provided at ends of each third coil spring 52. Each of the spring seats 54 includes a hard synthetic resin portion 54a. At least one of spring seats 54 provided at the ends of each third coil spring 52 includes an elastic cushion 54b fixed to hard synthetic resin portion 54a so as to oppose an opposite spring seat 54.

In the case where third spring mechanism 50 is provided, as shown in FIGS. 7 and 8, drive plates 16 and 18 of drive side flywheel 10 have first openings 17A and slots 19A, respectively, and second openings 17B and slots 19B, respectively. Circumferential ends of first openings 17A and slots 19A detachably engage air damper mechanism 80, and circumferential ends of second openings 17B and slots 19B detachably engage third spring mechanism 50.

Similarly, in the case where third spring mechanism 50 is provided, as shown in FIG. 25, arms 24b of driven plate 24 of driven side flywheel 20 detachably engage air damper mechanism 80 and third spring mechanism 50.

FIG. 20 illustrates a case where three air dampers 82 and three third coil springs 52 are provided and where air dampers 82 and third coil springs 52 are arranged one after the other in the circumferential direction of the flywheel device.

A torsional angle-torque characteristic and an engine speed-acceleration transmittance rate characteristic of the flywheel device according to the third embodiment will be explained with reference to FIGS. 22, 23 and 5. The vibrational system of FIG. 22 includes third spring mechanism 50 having a synthetic spring constant K2. In the case where no third spring mechanism 50 is provided, it should be understood that the spring constant K2 is equal to zero in the following explanations.

When air damper 82 strokes at a high speed, the air in air chamber 84 can scarcely pass through orifice 86 of air damper 82 and the air in air chamber 84 of air damper 82 operates so as to generate an air cushion spring operating as second spring mechanism 40. The synthetic spring constant of the air cushion springs of air dampers 82 is K1. For example, when three air dampers 82 are provided, the spring constant of the air cushion spring of each air damper 82 is K1/3, and the synthetic spring constant of air damper mechanism 80 including the three air dampers 82 is K1, because the three air dampers 82 are arranged parallel to each other as a spring arrangement. The spring constant K1 of air damper mechanism 80 changes corresponding to the speed of stroke of air damper 82. In this instance, when air damper 82 strokes at a high speed, the value of K1 is large, and air damper 82 operates comparatively rigidly. On the contrary, when air damper 82 strokes at a low speed, the value of K1 is small, and air damper 82 strokes comparatively freely.

Figure 23:
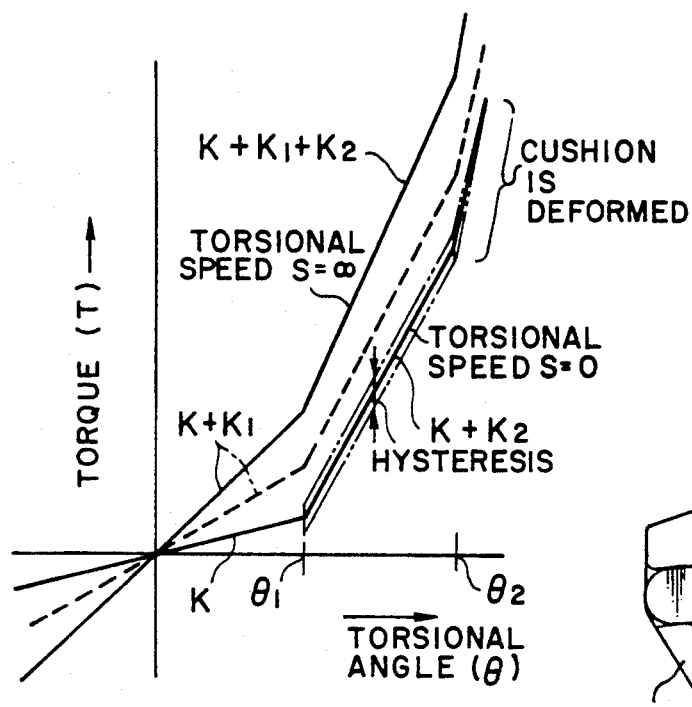
FIG. 23 is a diagram illustrating a torsional angle-torque characteristic of the flywheel device of the third embodiment.

Though FIG. 23 only illustrates the characteristic in a positive torsional angle range, the characteristic of the negative torsional angle range should be understood to be symmetric to that of the positive torsional angle range. As shown in FIG. 23, when the relative torsional angle is smaller than the angle of the predetermined gap θ1 between third spring mechanism 50 and driven side flywheel 20, only the first and second spring mechanisms 30 and 40 transmit the torque between drive side flywheel 10 and driven side flywheel 20, and the flywheel device operates according to the characteristic (shown by a broken line in FIG. 23) having a spring constant K+K1 which is a summation of the spring constant K of first spring mechanism 30 and the spring constant K1 of second spring mechanism 40. As was discussed above, the value of K1 changes corresponding to the torsional speed of the flywheel device. On the contrary, when the torsional angle is larger than the torsional angle $\theta 1$ and smaller than $\theta 2$, third spring mechanism 50 also operates. In this connection, the angle $\theta 2$ is a torsional angle where all the cushions of all the spring seats are brought into contact with the opposing spring seats. In the torsional angle range between $\theta 1$ and $\theta 2$, the flywheel device operates according to a characteristic K+K1+K2 that is defined as a summation of the spring constant K of first spring mechanism 30, the spring constant K1 of second spring mechanism 40 and the spring constant K2 of third spring mechanism 50. As was illustrated above, the value of K1 changes corresponding to the stroke speed of air damper 82. In torsional angles above the angle $\theta 2$, all the cushions including cushion 98 of every air damper 82 are elastically deformed. As a result, the characteristic rises with a very steep angle.

The engine speed-acceleration transmittance rate characteristic of the flywheel device or system according to the third embodiment is substantially the same as that of the flywheel device according to the first embodiment, and thus, FIG. 5 is also applicable to the third embodiment. However, when FIG. 5 is applied to the third embodiment, hydraulic damper 62 and hydraulic damping mechanism 60 in the explanations of the first embodiment should be read as air damper 82 and air damper mechanism 80, respectively. In this instance, the damping coefficient z of air damping mechanism 80 can be adjusted to a desired value by selecting the diameter of orifice 86, and the spring constant K1 can be adjusted to a desired value by selecting the volume of air chamber 84.

When seal ring 92 of air damper 80 is pressed against the inner surface of outer cylinder 88 of air damper 82, friction is generated between seal ring 92 and outer cylinder 88, and the damping of vibration is greatly suppressed.

As will be understood from FIG. 5, also in the third embodiment, suppression of resonance while passing through the resonance speed of first spring mechanism 30 is effectively suppressed, and the speed variation absorbing effect at the standard range of engine speeds above the idling speed of the engine is greatly improved. Further, according to the third embodiment, there is no fear of oil release because the viscous damping mechanism is constructed of air damper 82. Furthermore, because second spring mechanism 40 includes the air cushion of air damper 82 and there is no need to provide a second coil spring of metal unlike the first and second embodiments, the flywheel device of the third embodiment can be designed to be compact.

FOURTH EMBODIMENT shown in FIGS. 27-35 and also in FIGS. 5 and 6

A vibrational system and a torsional damper type flywheel device of the fourth embodiment further include a control plate 120 and a friction mechanism 140 in comparison with the flywheel device of the third embodiment.

More particularly, as shown in FIG. 29, a vibrational system for a torsional damper type flywheel device according to the fourth embodiment includes: the first and second members defining moment of inertias I1 and I2; a control plate member 120 rotatable relative to the first and second moment of inertia defining members I1 and I2; first spring member K connecting the first moment of inertia defining member I1 and control plate member 120; spring and viscous damping member A connecting the first moment of inertia defining member I1 and control plate member 120; and a friction member 140 connecting control plate member 120 and the second moment of inertia defining member I2. The spring and viscous damping member A includes second spring member K1 of air cushion operating parallel to first spring member K and viscous damping member V operating in series with second spring member K1.

As shown in FIG. 29, the vibrational system of the fourth embodiment also may include third spring member K2 arranged parallel to first spring member K and parallel to the series combination of second spring member K1 and viscous damping member V. Third spring member K2 connects the moment of inertia defining members I1 and I2 with a predetermined gap.

As shown in FIGS. 27 and 28, a torsional damper type flywheel device according to the fourth embodiment includes drive side flywheel 10, driven side flywheel 20 arranged coaxially with respect to drive side flywheel 10 and rotatable relative to drive side flywheel 10, a control plate 120 rotatable relative to the drive side and driven side flywheels 10 and 20, first spring mechanism 30 connecting drive side flywheel 10 and control plate 120, air damper mechanism 80 connecting drive side flywheel 10 and control plate 120 and including at least one air damper 82 defining air chamber 84 therein and having orifice 86, and a friction mechanism 140 connecting control plate 120 and driven side flywheel 20. Air damper mechanism 80 includes second spring mechanism 40 whose spring force is defined by the air cushion of air chamber 84 of every air damper 82 and the viscous damping mechanism whose damping force is generated by orifice 86 of every air damper 82. Second spring mechanism 40 and the viscous damping mechanism are arranged in series with each other as a vibrational system, and the series combination of second spring mechanism 40 and the viscous damping mechanism is arranged parallel to first spring mechanism 30 as a vibrational system.

The structures of drive side flywheel 10 of the fourth embodiment are substantially the same as those of drive side flywheels 10 of the third embodiment, and all the explanations made with respect to drive side flywheel 10 of the third embodiment are applicable to drive side flywheel 10 of the fourth embodiment, though the sizes of the openings 17A and 17B and slots 19A and 19B of the fourth embodiment (see FIGS. 31 and 32) are different from those of the third embodiment.

Also, the structures of driven side flywheel 20 of the fourth embodiment are substantially the same as those of driven side flywheel 20 of the third embodiment, and all the explanations made with respect to driven side flywheel 20 of the third embodiment are applicable to driven side flywheel 20 of the fourth embodiment, though the contour of the driven plate 24 of the fourth embodiment (see FIG. 33) is different from that of the third embodiment. In the fourth embodiment, the annular portion 24a of the driven plate 24 slidably engages friction mechanism 140.

Figure 34:
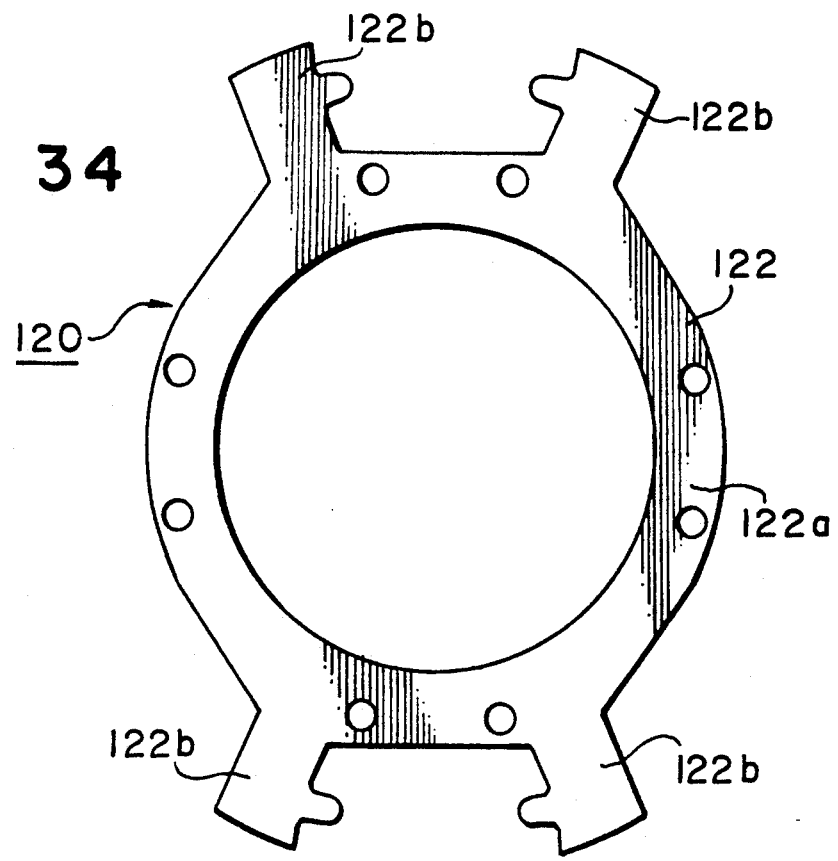
FIG. 34 is an elevational view of a control plate of the flywheel device according to the fourth embodiment.

As shown in FIG. 28, control plate 120 includes a pair of control plate elements 122 coupled to each other via rivets. As shown in FIG. 34, each of control plate elements 122 includes an annular portion 122a and arms 122b extending radially outwardly from annular portion 122a of control plate 120. Arms 122b detachably engage the air damper mechanism 80, and annular portion 122a slidably engages the friction mechanism 140.

The structures of the first spring mechanism 30 and air damper mechanism 80 including second spring mechanism 40 and the viscous damping mechanism of the fourth embodiment are the same as those of the first spring mechanism 30 and the air damper mechanism 80, respectively, of the third embodiment. Therefore, all the explanations made about the first spring mechanism 30 and the air damper mechanism 80 of the third embodiment are applicable to the respective structures of the fourth embodiment.

Figure 35:
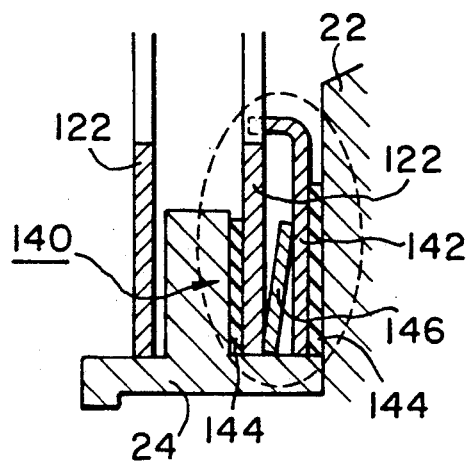
FIG. 35 a cross-sectional view of a friction mechanism of the flywheel device of the fourth embodiment.
Figure 31:
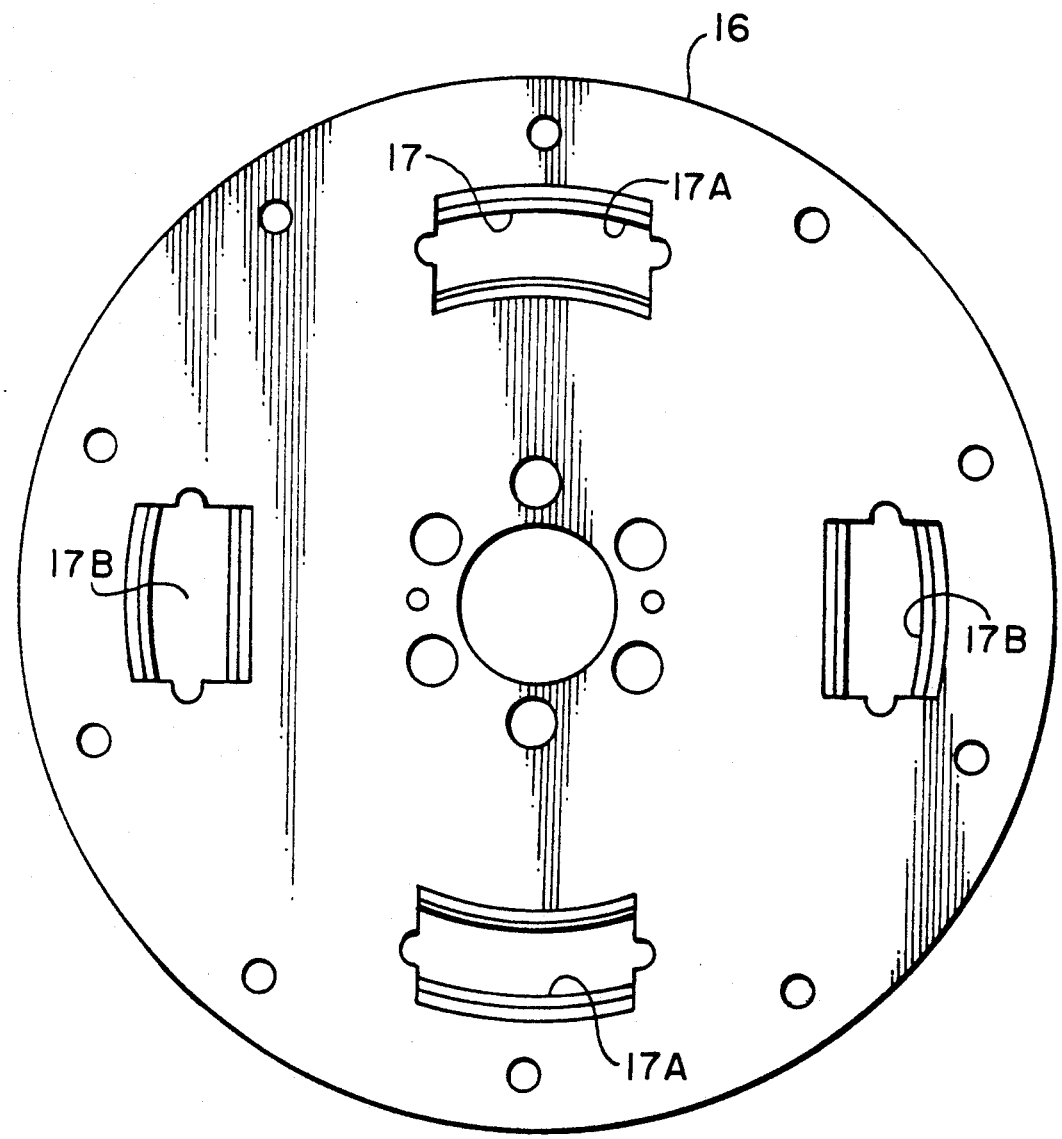
FIG. 31 is an elevational view of one of the drive plates of a drive side flywheel of the flywheel device according to the fourth embodiment.
Figure 32:
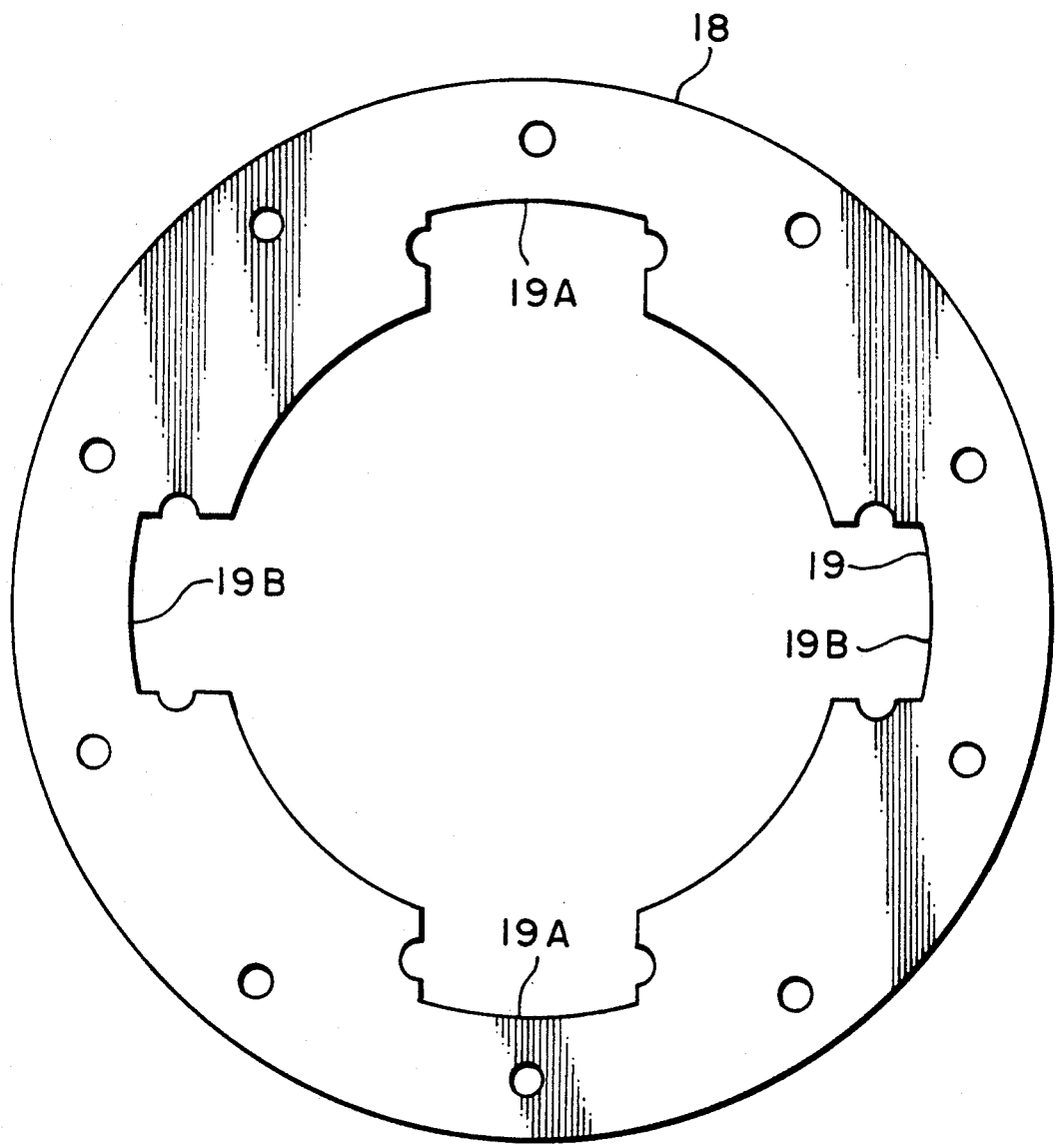
FIG. 32 is an elevational view of another of the drive plates of the drive side flywheel of the flywheel device according to the fourth embodiment.
Figure 33:
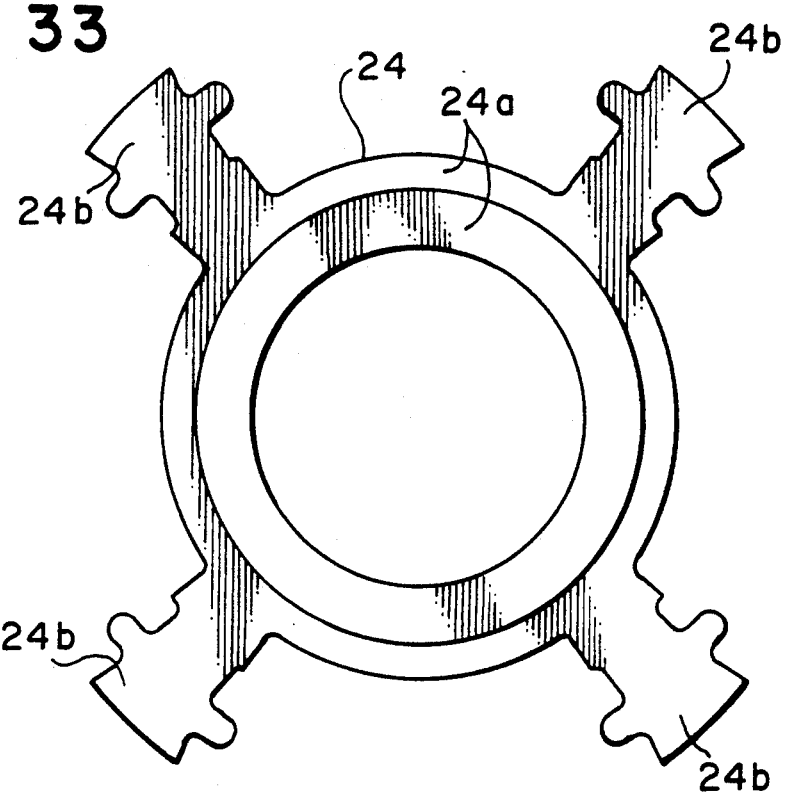
FIG. 33 is a an elevational view of a driven plate of a driven side flywheel of the flywheel device according to the fourth embodiment.

As shown in FIG. 35, friction mechanism 140 of the fourth embodiment includes a thrust plate 142 rotatable relative to the the drive side and driven side flywheels 10 and 20 and relative to control plate 120; a thrust lining 144 constructed of abrasive material; and a cone spring 146 generating a thrust force to thereby define the predetermined frictional force Fr of friction mechanism 140. Thrust plate 142, thrust lining 144 and cone spring 146 are interposed between control plate 120 and driven side flywheel 20.

In the fourth embodiment, as shown in FIGS. 26, 27, and 28, a third spring mechanism 50 may be provided as in the case of the third embodiment. In the case where third spring mechanism 50 is provided, the structures of the third spring mechanism 50 of the fourth embodiment are the same as those of the third spring mechanism 50 of the third embodiment, and all the explanations made with respect to the third spring mechanism 50 of the third embodiment are applicable to third spring mechanism 50 of the fourth embodiment.

The characteristic and operation of the flywheel device of the fourth embodiment will be explained.

Figure 30:
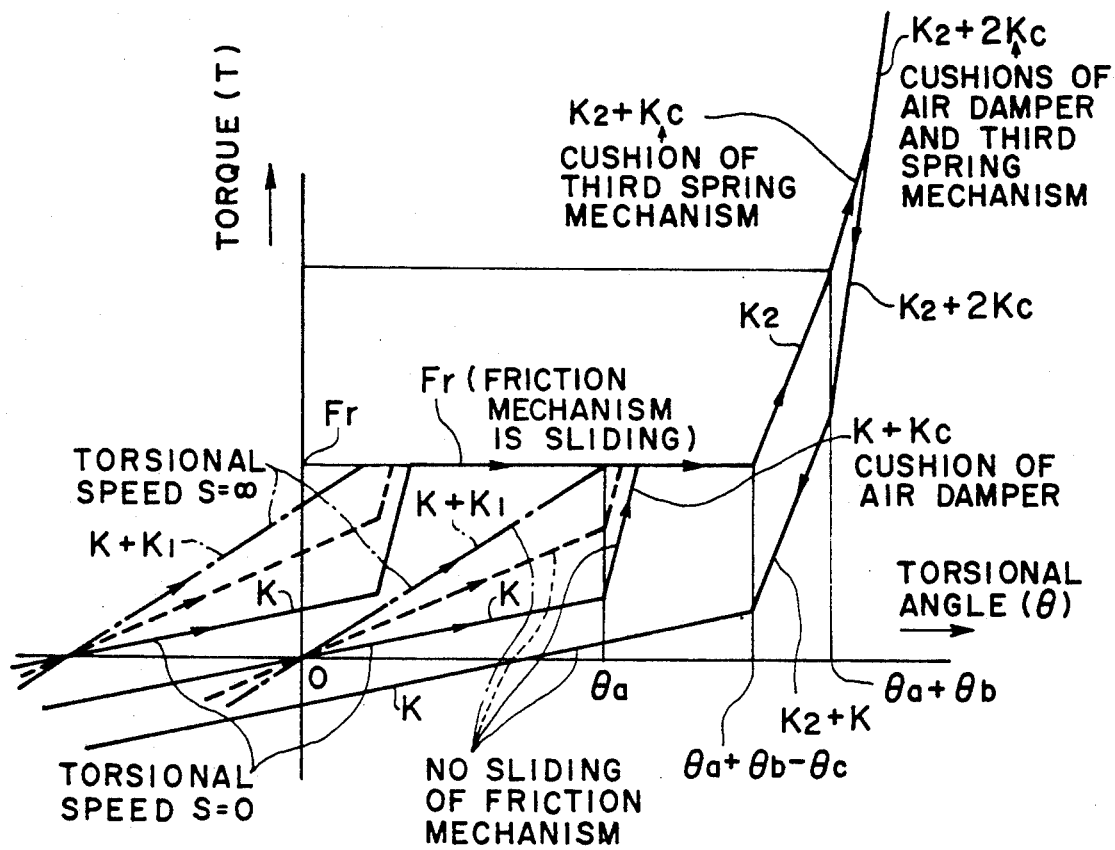
FIG. 30 is a diagram illustrating a torsional angle-torque characteristic of the flywheel device of the fourth embodiment.

As shown in FIG. 30, because the vibrational system and flywheel device of the fourth embodiment includes friction mechanism 140 which begins to slide when the torque force exceeding the predetermined frictional force Fr of friction mechanism 140 acts on friction mechanism 140, the torque characteristic is partially limited by the line defined by the frictional force Fr on which friction mechanism 140 slides, in comparison with the torque characteristic of the third embodiment shown in FIG. 23. More particularly, the characteristic line starts from point O and changes along a characteristic line positioned between the K characteristic and the K+K1 characteristic up to the torsional angle $\theta a$ where cushion 98 of air damper 62 begins to operate. The spring constant K1 of air cushion changes corresponding to the torsional speed between the drive side and driven side flywheels 10 and 20, and up to the torsional angle $\theta a$, friction mechanism 140 does not slide. At the angle $\theta a$, cushion 98 of air damper 82 is brought into contact with the opposing member. Thus, the characteristic line changes from the K+K1 characteristic to the K+Kc characteristic where Kc is a synthetic spring constant of cushion 98 of every air damper 82. When the torsional angle further increases and the force acting on friction mechanism 140 exceeds the predetermined frictional force Fr of friction mechanism 140, friction mechanism 140 begins to momentarily slide and generates a great frictional force. While friction mechanism 140 is sliding, the torque is limited by the friction mechanism 140. When the torsional angle further increases, third spring mechanism 50 is brought into contact with arms 24b of driven plate 24 at the angle $\theta a + \theta b - \theta c$, where $\theta b$ is an angular gap between air damper 82 and driven plate 24, and $\theta c$ is an angular deformation of cushion 98. Above the angle $\theta a + \theta b - \theta c$, third spring mechanism 50 also operates to transmit the torque. Between the torsional angle $\theta a$ and $\theta a + \theta b$, friction mechanism 140 continues to slide, and control plate 120 rotates relative to driven side flywheel 20. At the torsional angle $\theta a + \theta b$, arms 24b of driven plate 22 are brought into contact with air damper 82, and friction mechanism 140 stops its sliding. After that time, air damper 82 and third spring mechanism 50 transmit the torque between drive side flywheel 10 and driven side flywheel 20. When the torsional angle further increases, cushion 54b of spring seat 54 of third spring mechanism 50 is finally brought into contact with the opposing spring seat 54, and both cushion 54b (whose spring constant is Kc) of third spring mechanism 50 and cushion 98 of air damper 82 are elastically deformed to transmit a very large torque.

The engine speed-acceleration transmittance rate characteristic of the flywheel device of the fourth embodiment is the same as that of the third embodiment, and all the explanations made about the characteristic of the flywheel device of the third embodiment are applicable to the characteristic of the flywheel device of the fourth embodiment.

With respect to the advantages of the fourth embodiment, because friction mechanism 140 arranged in series with air damper mechanism 80 is provided, adjustment of the damping force of the torque transmitting path including air damper mechanism 80 and friction mechanism 140 is easily performed through only selecting the frictional force Fr of friction mechanism 140 without changing the damping characteristic of air damper 82. Further, a great damping force is obtained, because the damping includes not only the damping of air damper 82 but also the damping of friction mechanism 140.

In accordance with the present invention, the following effects are obtained.

Firstly, because the drive side and driven side flywheels 10 and 20 are connected by two kinds of torque transmitting paths arranged parallel to each other, that is, the path including first spring mechanism 30 and the path including second spring mechanism and the viscous damping mechanism, the flywheel device has its vibrational behavior which continuously changes between the two kinds of characteristics. As a result, the change of the vibrational behavior effectively suppresses the amplification of vibration while passing through the resonance speed of the vibrational system.

Secondly, because the change of the vibrational behavior is performed not through the continuously sliding friction mechanism of the prior art but through the viscous damping mechanism which may comprise hydraulic damping mechanism 60 or air damper mechanism 80, the speed variation and torque variation absorbing effect at the standard range of engine speeds is greatly improved. This will be easily understood from the fact that if the drive side and driven side flywheels were fixedly coupled so as not to rotate relative to each other, the acceleration transmittance rate would be 1; therefore, the acceleration transmittance rate of a flywheel device with the continuously sliding friction mechanism provided between the drive side and driven side flywheels would approach 1.

Thirdly, when no momentarily sliding friction mechanism is used as in the cases of the first and third embodiments, no characteristic change due to the abrasion of a friction mechanism and a momentary sticking of such a friction mechanism occur. The viscous damping mechanism does not tend to change its vibrational characteristic, because the characteristic is mainly determined by the volume of the chambers and the diameter of the orifice and because such dimensions of the chambers and the orifice do not change due to elapse of time. As a result, the vibrational characteristic of the flywheel device of the present invention is very stable and reliable. Furthermore, when the momentarily sliding friction mechanism 130 and 140 are used together with the viscous damping mechanism of hydraulic damping mechanism 60 or air damping mechanism 80, even if thrust linings 134 and 144 of friction mechanisms 130 and 140, respectively, are worn, the vibrational characteristics of the flywheel device remain stable due to the viscous damping mechanism. In this instance, the provision of friction mechanism 130 prevents an excessively large force from acting on hydraulic damper 62, and the provision of friction mechanism 140 makes easy the adjustment of the damping force of the flywheel device having air damper 82.

Although several embodiments of the invention have been described in detail above, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

What is claimed is:

1. A torsional damper type flywheel device comprising:
    a rotatable first flywheel;
    a second flywheel arranged coaxially with respect to the first flywheel and rotatable relative to the first flywheel;
    a first control plate rotatable relative to the first flywheel and the second flywheel;
    a first spring mechanism connected having a first end and a second end, said first end being connected to said first flywheel and said second end being connected to said second flywheel;
    a second spring mechanism having a first end and a second end, said first end being connected to said first flywheel and the second end being connected to said first control plate; and
    a hydraulic damping mechanism having a first side and a second side, said first side being connected to said first control plate and said second side being connected to said second flywheel;
    wherein the hydraulic damping mechanism includes at least one hydraulic damper that comprises:
        a first chamber filled with liquid;
        a second chamber filled with liquid; and
        an orifice disposed between and connecting said first and second chambers, said orifice generating a viscous damping when liquid flows therethrough.

2. The flywheel device according to claim 1, wherein the first flywheel includes:
    an outer ring;
    an inner ring disposed radially inside the outer ring; and
    drive plates disposed on opposite sides of the outer ring and fixed to the outer ring, the inner ring being fixed to one of the drive plates.

3. The flywheel device according to claim 2, wherein each of the drive plates has first and second openings formed therein, circumferential ends of the first openings detachably engaging the first spring mechanism and circumferential ends of the second openings detachably engaging the series combination of the second spring mechanism and the hydraulic damping mechanism.

4. The flywheel device according to claim 1, wherein the second flywheel comprises a flywheel body and a driven plate fixed to the flywheel body.

5. The flywheel device according to claim 4, wherein the driven plate comprises an annular portion and arms extending radially outwardly from the annular portion, the arms detachably engaging the first spring mechanism and the series combination of the second spring mechanism and the hydraulic damping mechanism.

6. The flywheel device according to claim 1, wherein the first spring mechanism includes at least one first coil spring and spring seats provided at ends of the first coil spring, each of the spring seats including a hard synthetic resin portion, and at least one of the spring seats provided at the ends of the first coil spring including an elastic cushion fixed to the hard synthetic resin portion so as to oppose an opposite spring seat.

7. The flywheel device according to claim 1, wherein the second spring mechanism includes at least one second coil spring and spring seats provided at ends of the second coil spring, each of the spring seats including a hard synthetic resin portion, and at least one of the spring seats provided at the ends of the second coil spring including an elastic cushion fixed to the hard synthetic resin portion so as to oppose an opposite spring seat.

8. The flywheel device according to claim 1, wherein the first control plate comprises a pair of first control plate elements.

9. The flywheel device according to claim 8, wherein each of the first control plate elements includes an annular portion and arms extending radially outward from the annular portion, the arms of the first control plate elements connecting the second spring mechanism and the hydraulic damping mechanism to one another.

10. The flywheel device according to claim 1, wherein the hydraulic damping mechanism comprises at least one hydraulic damper.

11. A torsional damper type flywheel device comprising:
    a rotatable first flywheel;
    a second flywheel arranged coaxially with respect to the first flywheel and rotatable relative to the first flywheel;
    a first control plate rotatable relative to the first flywheel and the second flywheel;
    a first spring mechanism connected having a first end and a second end, said first end being connected to said first flywheel and said second end being connected to said second flywheel;
    a second spring mechanism having a first end and a second end, said first end being connected to said first flywheel and the second end being connected to said first control plate; and
    a hydraulic damping mechanism having a first side and a second side, said first side being connected to said first control plate and said second second side being connected to said second flywheel;
    wherein said hydraulic damping mechanism includes at least one hydraulic damper which comprises:

a first outer cylinder and a second outer cylinder axially movable relative to each other;

an inner cylinder fixed to the second outer cylinder and axially slidable relative to the first outer cylinder, the inner cylinder having an orifice formed therein; and a diaphragm disposed on a side of the inner cylinder closer to the second cylinder, the inner cylinder and the first outer cylinder defining a first chamber therein, and the inner cylinder and the diaphragm defining a second chamber therein, the first and second chambers being filled with liquid and communicating with each other through the orifice formed in the inner cylinder so that the orifice generates a viscous damping when the liquid flows through the orifice.

12. The flywheel device according to claim 11, wherein the diaphragm and the second outer cylinder define an air chamber therein, the second outer cylinder having a hole formed therein, and the air chamber communicating with the environment through the hole formed in the second outer cylinder.

13. The flywheel device according to claim 11, further comprising a return spring disposed in the first chamber and biasing the inner cylinder in a direction away from the first outer cylinder.

14. The flywheel device according to claim 13, further comprising a spring seat disposed in the first chamber and supporting one end of the return spring.

15. The flywheel device according to claim 14, further comprising a seal member slidable relative to the first outer cylinder and sealing a sliding clearance between the inner cylinder and the first outer cylinder, the seal member being held between the inner cylinder and the spring seat which is biased by the return spring toward the inner cylinder.

16. The flywheel device according to claim 11, wherein the first and second outer cylinders have end portions having contours similar to spring seats disposed at ends of a coil spring of the second spring mechanism.

17. A torsional damper type flywheel device comprising:

a rotatable first flywheel;

a second flywheel arranged coaxially with respect to the first flywheel and rotatable relative to the first flywheel;

a first control plate rotatable relative to the first flywheel and the second flywheel;

a first spring mechanism connected having a first end and a second end, said first end being connected to said first flywheel and said second end being connected to said second flywheel;

a second spring mechanism having a first end and a second end, said first end being connected to said first flywheel and the second end being connected to said first control plate; and a hydraulic damping mechanism having a first side and a second side, said first side being connected to said first control plate and said second side being connected to said second flywheel;

wherein the hydraulic damping mechanism includes at least one hydraulic damper that comprises:

a first chamber filled with liquid;

a second chamber filled with liquid; and an orifice disposed between and connecting said first and second chambers, said orifice generating a viscous damping when liquid flows therethrough; and wherein the torsional damper type flywheel device has a torque versus torsional angle characteristic that is variable according to a torsional speed between a K characteristics where only the first spring mechanism operates and a K+K$l$ characteristics where both the first spring mechanism and the second spring mechanism operate.

* * * * *